US010191486B2

(12) United States Patent
Baer et al.

(10) Patent No.: US 10,191,486 B2
(45) Date of Patent: Jan. 29, 2019

(54) UNMANNED SURVEYOR

(71) Applicant: Aveopt, Inc., Ann Arbor, MI (US)

(72) Inventors: Wayne Graf Baer, Barrington, IL (US); Timothy James Nash, Traverse City, MI (US)

(73) Assignee: Aveopt, Inc., Ann Arbor, MI (US)

( * ) Notice: Subject to any disclaimer, the term of this patent is extended or adjusted under 35 U.S.C. 154(b) by 0 days.

(21) Appl. No.: 15/471,643

(22) Filed: Mar. 28, 2017

(65) Prior Publication Data

US 2017/0277180 A1 Sep. 28, 2017

Related U.S. Application Data

(60) Provisional application No. 62/314,267, filed on Mar. 28, 2016.

(51) Int. Cl.
*G05D 1/00* (2006.01)
*B64C 39/02* (2006.01)
(Continued)

(52) U.S. Cl.
CPC ......... *G05D 1/0038* (2013.01); *B64C 39/024* (2013.01); *B64D 47/08* (2013.01); *G01C 11/00* (2013.01); *G01S 17/023* (2013.01); *G01S 17/10* (2013.01); *G01S 17/933* (2013.01); *G01S 19/13* (2013.01); *G01S 19/47* (2013.01);
(Continued)

(58) Field of Classification Search
CPC .. G05D 1/0038; G05D 1/0016; B64C 39/024; B64C 11/00; B64C 2201/127; B64C 2201/146; G01S 19/13; G01S 17/023; G01S 17/10; G01S 17/933; G01S 19/47
See application file for complete search history.

(56) References Cited

U.S. PATENT DOCUMENTS 9,269,239 B1\* 2/2016 Jensen ............... G06K 9/00671
2015/0314440 A1 11/2015 Parker
2016/0314545 A1\* 10/2016 Jessen .................... G06Q 50/16

OTHER PUBLICATIONS

Li et al., "Robust Visual Tracking Based on an Effective Appearance Model," National Laboratory of Pattern Recognition, retrieved on Mar. 7, 2016.

(Continued)

*Primary Examiner* — Mussa A Shaawat
(74) *Attorney, Agent, or Firm* — Marshall & Melhorn, LLC

(57) ABSTRACT

A system may include an unmanned surveyor and a controller for the surveyor. The controller may include a headset. The surveyor includes a vehicle for moving within an environment and a camera for capturing video or images of the environment. The surveyor identifies points within the environment, and positions of those points (e.g., latitude, longitude, elevation). The surveyor may calculate spatial dimensions of virtual lines and/or shapes superimposed within the real-world environment. The controller may control the surveyor. The surveyor may be responsive to a controller headset that detects movement. The controller may display video or images captured by the surveyor, and may provide to a user an immersive first-person perspective of the environment. The user may utilize the controller to superimpose virtual lines and shapes onto the environment. These superimposed lines and shapes may trace real-world objects, enabling the user to remotely evaluate features of the real-world objects.

18 Claims, 12 Drawing Sheets

(51) Int. Cl.
| | |
|---|---|
| *B64D 47/08* | (2006.01) |
| *G01C 21/18* | (2006.01) |
| *G01S 17/89* | (2006.01) |
| *G01S 19/13* | (2010.01) |
| *G01C 11/00* | (2006.01) |
| *G01S 17/02* | (2006.01) |
| *G01S 17/10* | (2006.01) |
| *G01S 17/93* | (2006.01) |
| *G01S 19/47* | (2010.01) |

(52) U.S. Cl.
CPC ...... *G05D 1/0016* (2013.01); *B64C 2201/127* (2013.01); *B64C 2201/146* (2013.01)

(56) References Cited

OTHER PUBLICATIONS

Perone, "Real time Drone object tracking using Python and OpenCV," Terra Incognita, retrieved on Mar. 7, 2016.
"Quadcopter: Typical Control Board Circuit," Quads for Fun, retrieved on Mar. 8, 2016.
"Unmanned aerial vehicle," https://en.wikipedia.org/wiki/Unmanned_aerial_vehicle, retrieved on Mar. 4, 2016.
"How to Teach Your Drone to Track Things," https://motherboard.vice.com/en_us/article/8qxky3/how-to-teach-your-drone-to-track-things, retrieved on Mar. 7, 2016.
Yavrucuk, et al., "A Low Cost Flight Simulator Using Virtual Reality Tools," AIAA Modeling and Simulation Technologies Conference, Aug. 10-13, 2009, Chicago, IL, retrieved on Mar. 7, 2016.

\* cited by examiner

UNMANNED SURVEYOR

CROSS-REFERENCE TO RELATED APPLICATION

This application claims priority to and benefit of U.S. Provisional Application Ser. No. 62/314,267, which was filed on Mar. 28, 2016 and is titled "Unmanned Surveyor," the entire disclosure of which is expressly incorporated herein by reference.

TECHNICAL FIELD

This disclosure relates to an unmanned surveyor, and in particular, to control of an unmanned surveyor.

BACKGROUND

An unmanned aerial vehicle (UAV) is an aircraft that operates without a pilot aboard. A UAV may be an airplane or helicopter, for example, radio-controlled by a human utilizing a handheld radio controller. UAVs have a number of uses. For example, militaries around the world have developed weaponized drones configured to deliver bombs or missiles.

While a remote operator can use a UAV to view an environment from the UAV's perspective, the information available to the remote operator (e.g., via a camera mounted to the UAV) is typically inferior to information that can be collected in-person. For example, while a structural engineer might use a UAV to visually observe a crack in a building, he or she typically would be unable to precisely quantify the nature of the crack, making it difficult to accurately analyze the structural integrity of the building. By comparison, when visiting the building in-person, the engineer can inspect the building (where accessible) to measure the dimensions of the crack (e.g., the depth, width, and height), which might be used in an analysis regarding the structural integrity of the building.

SUMMARY

A system may include an unmanned surveyor and a controller for the surveyor. The controller may include a headset. The surveyor includes a vehicle for moving within an environment and a camera for capturing video or images of the environment. The surveyor identifies points within the environment and positions of those points (e.g., latitude, longitude, elevation). The surveyor may calculate spatial dimensions of virtual lines and/or shapes superimposed within the real-world environment.

The controller may control the surveyor. The surveyor may be responsive to a controller headset that detects movement. The controller may display video or images captured by the surveyor, and may provide to a user an immersive first-person perspective of the environment. In an embodiment, the controller displays a virtual-reality environment.

The user may utilize the controller to superimpose virtual lines and shapes onto the displayed environment. These superimposed lines and shapes may trace real-world objects, enabling the user to remotely evaluate dimensions of the real-world objects. In an embodiment, the surveyor and/or controller may include autonomous systems and/or robotic ground units. In an embodiment, the surveyor and/or controller may process images and/or data in real-time.

DETAILED DESCRIPTION

Figure 1:
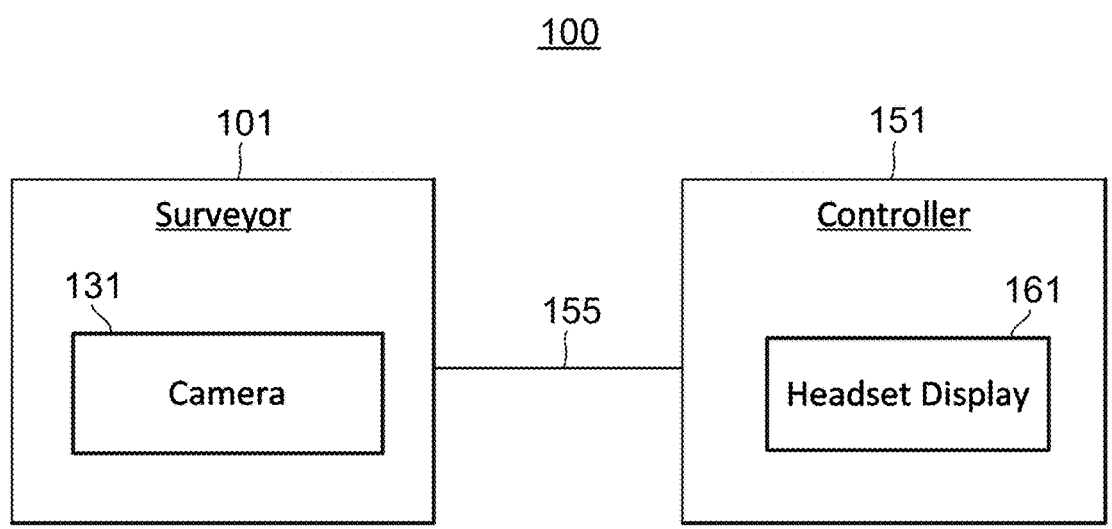
FIG. 1 is a block diagram of an example system according to an embodiment.

FIG. 1 is a block diagram of an example system 100 according to an embodiment. Depending on the embodiment, the system 100 may have a number of applications. Example use cases include: refinery fuel storage applications; showing present-to future designs for interior decoration (e.g., remodeling); scanning environments for an active shooter; HAZMAT applications (e.g., spill calculation of volume/direction and/or magnitude of flow); fatal MVA scene re-construction; TV coverage (e.g., the Masters); architecture applications; construction applications; forward observer applications; infrastructure inspection; first responder applications; disaster relief applications; damage assessment applications; insurance adjustment applications; wind turbine inspection; etc. The system 100 may utilize a precision payload sensor with Electro Optical video and/or Infrared information (LRF); a methodology to gather non-contact data; a process to calibrate and compensate raw data; various systems for command and control; and 3D rendering for Virtual Reality display of Real World Objects (e.g., which may be displayed just as they exist, at a very high fidelity). The system 100 may implement gas (e.g., methane) detection techniques, such as the technique of FTIR (Fourier Transform Infra Red) and/or hyper-spectral imaging.

The system 100 includes an unmanned surveyor 101 (sometimes just called "surveyor 101") and a controller 151. The surveyor 101 is an unmanned vehicle-based system including a camera 131 configured to capture images and/or video of a real-world scene. Generally speaking, the term "unmanned" means the surveyor 101 does not have an on-board pilot. The camera 131 may capture video and store or send the video in a number of formats (e.g., FLV, MPEG-1, MPEG-2, MPEG-4, RealMedia, Windows Media Video, QuickTime, AVI, Ogg, F4V, etc.) The camera 131 may record video at various resolutions, depending on the embodiment (e.g., 480p, 720p, 1080p, 4k). The camera 131 may record at various frame rates, depending on the embodiments (e.g., 120, 60, 30, 24, 12, or fewer than 12 frames per second). The camera 131 may have a weight over 200 g, between 100 g and 200 g, between 50 g and 100 g, or below 50 g, depending on the embodiment. The camera 131 may be enclosed within a waterproof case in an embodiment. The camera 131 may have a battery capable of powering the camera 131 for up to one hour, one hour to two hours, two hours to four hours, or over four hours, depending on the embodiment. The camera 131 may be capable of capturing still images.

The controller 151 is a computer system including a headset display 161 configured to display images and/or video. The headset display 161 is part of a headset configured to be worn on the head of a user. In an embodiment, the controller 151 is embodied entirely within the headset. In other embodiments, the controller 151 includes components not part of the headset. For example, in an embodiment the controller 151 may include a handset including actuators (e.g., buttons or touchpads) and/or movement/position sensors that are utilized to send commands to the surveyor 101 (e.g., for causing the surveyor 101 to move).

The surveyor 101 may be communicatively coupled to the controller 151 via a link 155. The link 155 may be utilized by the controller 151 to command the surveyor 101 (e.g., to move and/or to capture images or video), and/or may be utilized by surveyor 101 to transmit images or video to the controller 151. In an embodiment, the link 155 is wireless. For example, the link 155 may be a Wifi link supporting communications in the 900 MHz and 2.4, 3.6, 5, 5.8 and/or 60 GHz frequency bands. Depending on the embodiment, other frequency bands may be used, such as 27, 49, 50, 53, 72, or 75 MHz. In an embodiment, military ("MIL") frequency embodiments are utilized. In an embodiment, the link 155 includes cellular links or networks (e.g., utilizing various protocols such as 4G, 4G LTE+, 3G, 1×-RTT, etc., and/or various frequency bands such as 700 MHz, 850 MHz, 1700/2100 MHz, 1900 MHz, etc.). In an embodiment, the link 155 includes satellite links or networks. In an embodiment, the Iridium satellite constellations may be utilized, for example, for inspection of Alaska pipelines (e.g., utilizing bi-directional data link at 1616-to-1625.5 MHz). Satellite and or cellular links may enable control of the surveyor 101 by the controller 151 without line-of-sight proximity.

The controller 151 is configured to control the surveyor 151. For example, the controller 151 may transmit signals to the surveyor 101 to: (i) cause the surveyor 101 to move to a desired position, and (ii) cause the surveyor 101 to capture images and/or video of the environment of the surveyor 101. These signals may be transmitted by the controller 151 in response to user input from a human operator of the controller 151. The surveyor 101 may transmit the recorded images or video to the controller 151, where the images or video may be displayed via the headset display 161.

For example, the surveyor 101 may capture an image or video via the camera 131. The surveyor 101 transmits via the link 155 a signal carrying data representing the captured image or video. The controller 151 receives via the link 155 the image or video signal from the surveyor 101. References herein to an image signal may refer to a signal carrying data representing a single image or data representing video (i.e., data representing a series of images to be displayed over time). The surveyor 101 may transmit position and/or orientation data in addition to the image/video data. The position and/or orientation data may relate to position (absolute and/or relative), direction, and/or orientation of the surveyor 101 and/or of a target.

The controller 151 generates and displays via the display 161 an image or video (representing the captured real-world scene) according to the received image signal. The images or video may be rendered into 3D for display in a virtual reality and/or augmented reality environment. The image or video may be displayed in real-time, near real-time, or some later time (e.g., post-processed video). The term "real-time" is generally synonymous with "near real-time," and typically refers to a lag of five seconds or less between the time at which the surveyor 101 captures the image or video and the time at which the controller 151 displays the image or video.

The controller 151 detects input from a user while displaying the image or video. In response to the user input, the controller 151 generates and displays a "virtual graph." A virtual graph comprises one or more anchor points. A virtual graph may also comprise lines between anchor points, and/or shapes overlaying the real-world scene depicted in the video. A virtual graph may be displayed by displaying a visual indicator (e.g., a bright green dot, line, and/or shape) associated with the anchor points, lines, and/or shapes. In an embodiment, an automated approach is utilized wherein a "global command" is transmitted to the surveyor 101 to cause the surveyor 101 to define a target automatically and to track and relay that data acquired tracking the target. In an embodiment (and as an example), the surveyor 101 tracks T-72s within a certain region (e.g., a 3 square kilometer region that is bounded by certain coordinates) having a certain velocity vector not equal to zero and a position change over time. A T-72 is a Russian built tank, but it will be understood that the surveyor 101 may target and/or track any other tank or object, as appropriate. In an embodiment, the surveyor 101 documents existing interior and/or exterior walls, furnishings, landscaping, etc., for an interior and/or exterior space. The documented information is transmitted to the controller 151 and displayed. The controller 151 may also display virtual furnishings to aid interior design.

An "anchor point" is a virtual object associated with a real-world position. For example, a generated anchor point may be assigned latitude and longitude coordinates, as well as an altitude. The controller 151 may determine a distance from the surveyor 101 to a position associated with the anchor point (i.e., from the real-world position of the surveyor 101 to the real-world position associated with the anchor point). In response to user input, the controller 151 may generate and display multiple anchor points and/or lines between anchor points. An anchor point may be displayed by displaying a visual indicator, such as a bright green dot. In some instances, the anchor points and/or lines are connected to form a shape. In such instances, the anchor points and lines forming the shape function as vertices and edges of the shape. In an embodiment, the surveyor 101 and/or controller 151 generate anchor points, lines, and/or shapes autonomously. Because the anchor points are associated with real-world positions, the surveyor 101 and/or controller 151 may determine real-world dimensions associated with lines or shapes overlaying the real-world scene depicted by the controller 151. Said another way, the lines and shapes are virtual objects associated with real-world coordinates. In a sense, these virtual objects are superimposed within the 3D space of the real-world scene captured by the camera 131. Accordingly, a user may utilize the system 100 to trace real-world objects (RWOs), enabling the user to measure the RWOs.

The system 100 may have a number of benefits. For example, the surveyor 101 may be deployed in a combat region and utilized to evaluate the size of enemy troop buildups, size of entry points, or distances from structure to structure. Engineering inspectors may utilize the system 100 to get measurements of parts and materials that may need to be replaced. Human surveyors may utilize the system 100 to plot out sections of land and to get measurements of the plots and square footage of any part of the land. The system 100 may be useful for interior design, accident investigation, infrastructure inspection (e.g., bridges, pipelines, powerlines, refineries, etc.), HAZMAT spill analysis, customs and border patrol functions, DHS port authority functions, airport perimeter control, etc. The surveyor 101 and controller 151 are described in more detail below.

Components of the Surveyor 101

Figure 2:
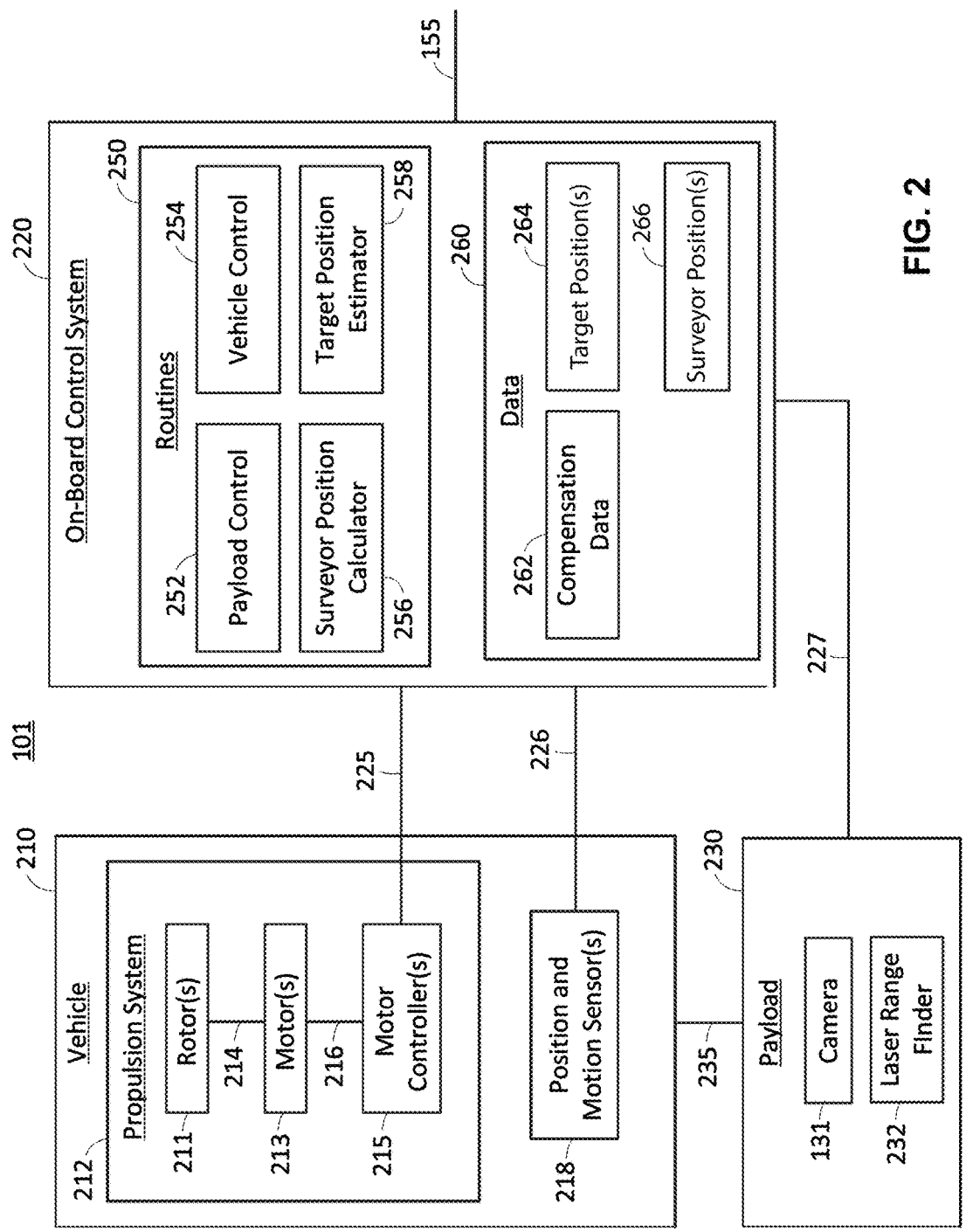
FIG. 2 is a block diagram of a surveyor according to an embodiment.

FIG. 2 is a block diagram of the surveyor 101 according to an embodiment. The surveyor 101 includes a vehicle 210, a control system 220, and a payload 230.

The vehicle 210 is an unmanned multi-copter. In some embodiments, the vehicle 210 and may be any suitable aerial vehicle, such as an airplane, hovercraft, helicopter, multicopter, quadcopter, etc. In an embodiment, the vehicle 210 is a ground-based vehicle, such as a car. For example, in an embodiment a car or other ground-based vehicle carries a payload (e.g., a camera or other sensor) for capturing images, video, and other data about a particular area (e.g., certain streets or roads). The vehicle 210 includes a propulsion system 212 configured to move the vehicle 210, as well as one or more position/motion sensors 218 (e.g., a GPS sensor, an accelerometer, a gyroscope, an altimeter, etc.).

In an embodiment, the propulsion system 212 may include one or more rotors 211 (i.e., one or more wings or blades configured to generate aerodynamic lift to move the vehicle 210 vertically and/or thrust to move the vehicle 210 in the horizontal plane). The propulsion system 212 may include one or more motors 213 configured to drive the rotors 211 and one or more motor controllers 215 configured to control the motors 213. In an embodiment, the link 225 may communicatively connect the control system 220 to the motor controllers 215. A motor 213 may be communicatively connected to a motor controller 215 via a link 216. A motor 213 may be connected via a mechanical link 214 to a rotor 211. The mechanical link 214 may include a shaft and transmission, for example.

The control system 220 is a computer system that may be affixed to the vehicle 210 via a mount or casing (not shown). The control system 220 may include a processor, memory, and/or communication interface (not shown). The memory of the control system 220 may store one or more routines 250 and data 260. For example, the memory of the control system 220 may store a payload control routine 252, a vehicle control routine 254, a surveyor position calculator routine 256, and a target position estimator routine 258. When executed by a processor of the control system 220, the control system 220 implements the techniques or methods defined by the routines 252-258. When executed by a processor of the control system 220: (i) the payload control routine 252 may cause the control system 220 to implement control of the objects include in the payload 230 (e.g., the camera 131 and/or the LRF 232); (ii) the vehicle control routine 254 may cause the control system 220 to implement control of the vehicle 210; (iii) the surveyor position calculator 256 may cause the control system 220 to calculate a position of the surveyor 101; and (iv) the target position estimator 258 may cause the control system to estimate a position of a target lased by the LRF 232 (e.g., based on data from the LRF 232, the compensation data 262, and/or the surveyor position data 266).

The functionality of the routines 250 may be provided by a single routine in some embodiments. Further, the functionality of each routine 250 may be divided among multiple routines or subroutines not shown in FIG. 2. In an embodiment, one or more of the routines 250 are implemented by way of application specific hardware modules (e.g., ASICs) rather than by routines executed by a general purpose computer.

Figure 5:
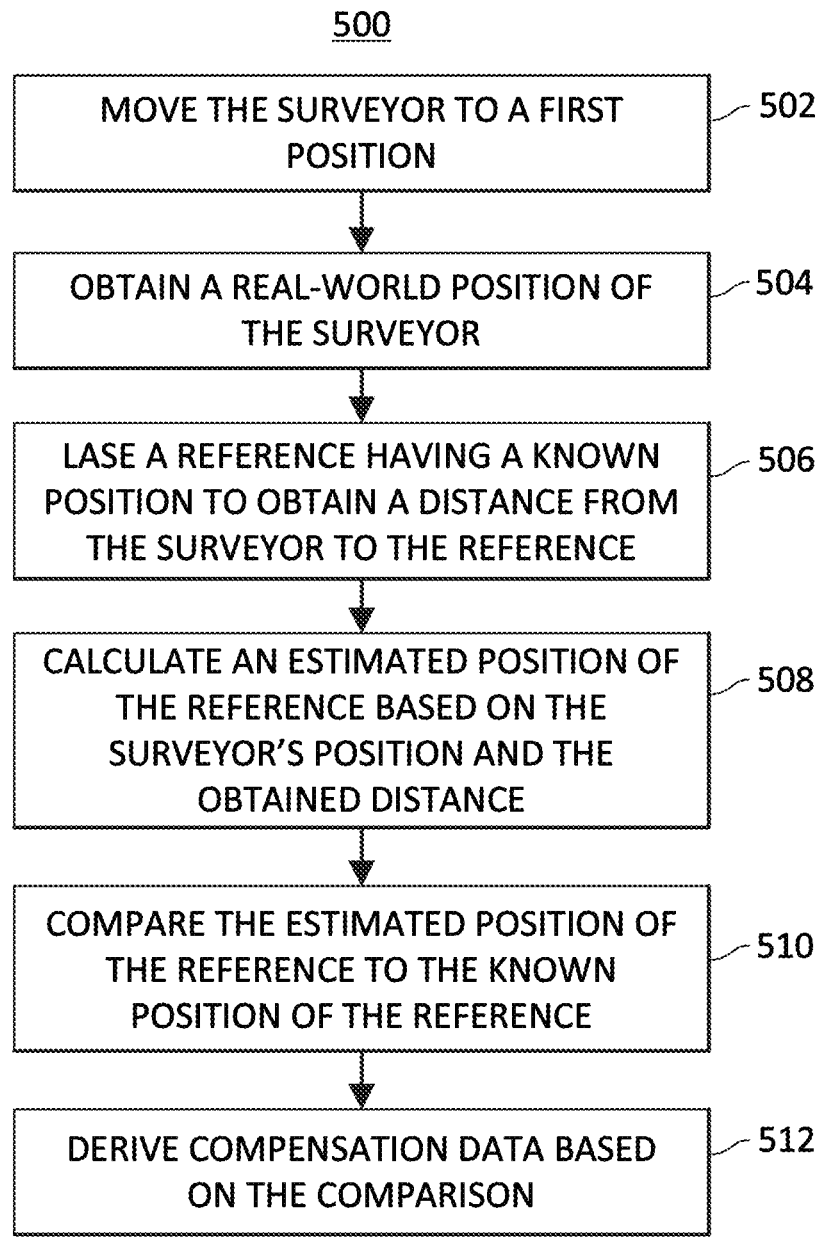
FIG. 5 is a flow chart of an example method of calibrating a surveyor according to an embodiment.

The compensation data 262 is data obtained during a calibration of the surveyor (such as the calibration method shown in FIG. 5). The compensation data 262 may be applied to measurements obtained from the LRF 232 to obtain an estimated target position (which may be saved as target position data 264) and/or an estimated surveyor position and/or orientation (either of which may be saved as surveyor position data 266).

The control system 220 may be communicatively coupled to the propulsion system 212, the position and/or motion sensors 218, and the payload 230 via the links 225, 226, and 227, respectively. The control system 220 may communicate with the camera 131 via the link 227. In an embodiment, the communication links 225-227 are each wired. In an embodiment, one or more of the communication links 225-227 are wireless.

The payload 230 includes one or more objects carried by the vehicle 210. For example, the payload 230 includes: (i) the camera 131 (also shown in FIG. 1), which is configured to capture images and/or video, and (ii) a laser range finder (LRF) 232. In an embodiment, the LRF 232 may utilize a solid-state diode laser, and may be precise to 0.01 cm over 3 km. In an embodiment, the LRF 232 may utilize lasers in the NIR (Near InfraRed) spectrum (830-1100 nm) and/or in the SWIR (Short Wave InfraRed) spectrum (1300-1550 nm). In an embodiment, the LRF 232 may be a ER (erbium)-doped laser that is useful for long-range data capture. In an embodiment, the LRF 232 is a LiDAR solution including multiple LRFs working in unison to achieve a "scanning" effect. In such an embodiment, the virtual graph (e.g., including multiple anchor points) can be easily and quickly acquired. This could be very beneficial in an interior space scan, saving time and money.

One or more of the objects included in the payload 230 may be affixed to the vehicle 210 via the mount 235. In an embodiment, the payload 230 includes only the camera 131. The camera 131 and/or LRF 232 may be affixed to the vehicle 210 via the mount 235.

Example Operation of the Surveyor 101

The surveyor 101 functions in a number of different ways: (i) it captures images and/or video via the camera 131; (iii) it may determine its position and/or orientation in space; (iii) it may move within the real-world environment via the vehicle 210; and (iv) it may collect via the LRF 232 spatial data relating to RWOs depicted in scenes captured by the camera 131, and may estimate a position for the RWOs.

First, the surveyor 101 may utilize the camera 131 to capture images and/or video. To control the camera 131, the control system 220 may implement the payload control routine 252. The control system 220 may send and receive signals via the link 227. In example operation, the control system receives via the link 155 a command to capture an image or video of a real-world scene ("capture command"). This capture command may have been transmitted by the controller 151 shown in FIGS. 1 and 3. In response to receiving the capture command, the control system 220 transmits via the link 227 a command to activate the camera 131 ("activation command). In an embodiment, the control system 220 transmits the activation command not in response to the capture command, but based on internal logic.

The camera 131 receives the activation command and, in response, captures an image or begins recording a video. The camera 131 transmits via the link 227 the captured video or image. The control system 220 receives the video or image and wirelessly transmits via the link 155 an image signal carrying data representing the video or image. The image signal is received by the controller 151 shown in FIGS. 1 and 3, where the video or image may be displayed via the display 161.

Second, the surveyor 101 may determine a position and/or orientation of the surveyor 101 in space. The control system 220 may receive via the link 226 signals including data representing position and/or motion of the vehicle 210. This position and/or motion data may be generated by the sensors 218. For example, a GPS sensor may transmit coordinate positions and/or altitude of the vehicle 210 to the control system 220. One or more accelerometers may transmit measured acceleration forces along various axes of the vehicle 210 to the control system 220. One or more gyroscopes may transmit a measured rate of rotation around various axes of the vehicle 210 to the control system 220. One or more altimeters may transmit a measured altitude (e.g., measured based on a detected pressure) to the control system 220. One or more compasses may transmit a detected direction of orientation to the control system 220.

The control system 220 may rely on the received orientation and position measurements to calculate a position in three-dimensional space for the surveyor 101 (e.g., a latitude, longitude, and/or elevation/altitude). Further, the control system 220 may rely on the received orientation and position measurements to calculate an orientation of the surveyor 101 (e.g., pitch, roll, yaw, heading direction, etc.). Accordingly, the control system 220 may track movements of the surveyor 101 in multiple degrees of freedom (e.g., up to ten degrees of freedom). For example, the control system 220 may track one or more of the following: forward/backward position, up/down position, left/right position, forward/backward movement, up/down movement, left/right movement, pitch rotation, roll rotation, yaw rotation, and/or orientation relative to true and/or magnetic north.

These tracked movements can be relied on to track a course heading of the surveyor 101 (e.g., representing by a vector in 3D space). The control system 220 can also track the vehicle heading of the surveyor 101 (i.e., which direction is the "front" of the surveyor 101 facing) based on, e.g., measurements from a compass. In an embodiment, the control system 220 may transmit via the link 155 one or more received orientation and position measurements to the controller 151. The control system 220 may transmit via the link 155 a calculated position and/or orientation of the surveyor 101 to the controller 151.

Third, the surveyor 101 may utilize the vehicle 210 to move the surveyor 101. To control movement of the vehicle 210, the control system 220 may implement the vehicle control routine 254. The control system 220 may send and receive signals via the link 225. The propulsion system 212 may receive on of these signals and respond by generating force sufficient to move the vehicle 210. For example, one or more motor controllers 215 may receive one or more signals indicating the rotors 211 need to be sped up (e.g., to generate lift) or slowed down (e.g., to descend). In response to receiving one of these signals, a motor controller 215 may transmit via a link 216 a signal to cause the connected motor 213 to speed up or slow down as desired. For example, depending on the configuration of the motor 213, the motor controller 215 may control the connected motor 213 (and thus the connected rotor 211) by varying voltage or current supplied to the motor 213 via the link 216. When the motor 213 speeds up or slows down, the connected shaft 214 rotates at a higher or lower speed, which causes the attached rotor 211 to increase or decrease rotation speed. In some instances, the rotors 211 may be controlled at different speeds to generate thrust in a horizontal direction.

Figure 7:
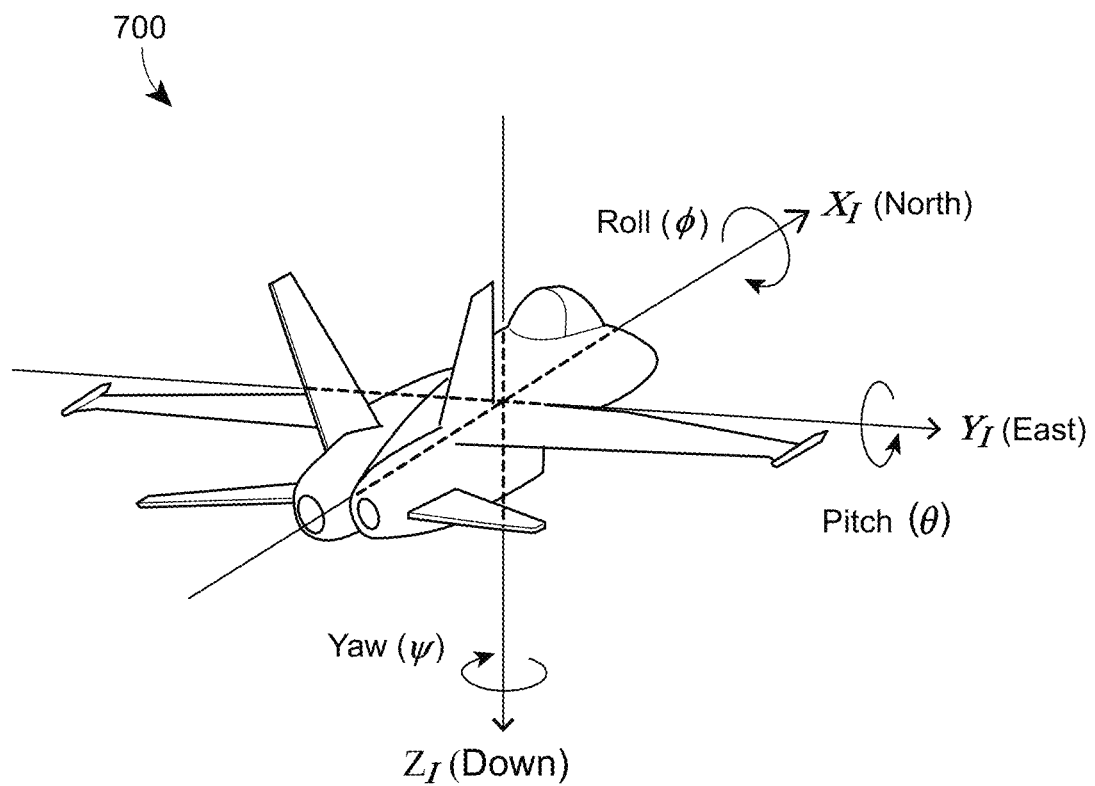
FIG. 7 depicts a vehicle (an aircraft in this case) and multiple axes about which the vehicle may move and/or rotate according to an embodiment.

In some instances, the control system 220 may rely on orientation and position measurements to calculate how the vehicle 210 needs to be repositioned and to select the appropriate commands to be sent to the propulsion system 212. For example, the control system 220 may utilize the measured acceleration forces and rates of rotation to detect movement of the vehicle 210 in one or more of the previously mentioned degrees of freedom. As an example, the control system 220 may detect that the vehicle is rolling (e.g., due to wind), and may transmit signals to the propulsion system 212 to increase the speed of the downwind rotors 211 in order to generate more lift on the downwind side of the vehicle 210 and to restore a level position. To illustrate, FIG. 7 depicts three axes along the vehicle 210 may move and/or change orientation. Position, movement, and/or orientation of the vehicle 210 may be tracked in multiple (e.g., ten) degrees of freedom.

Fourth, the surveyor 101 may collect spatial data relating to RWOs via the LRF 232, and may estimate a position (e.g., latitude, longitude, and/or elevation/altitude) for the RWOs. These may be RWOs depicted in scenes captured by the camera 131. In an embodiment, the surveyor 101 collects spatial data relating to RWOs not depicted in scenes captured by the camera 131. For example, a beacon like LORAN may be utilized, a monument/benchmark may be utilized, a differential GPS beacon may be utilized, etc. To collect spatial data and estimate a position for an RWO, the control system 220 may implement the payload control routine (e.g., to activate the LRF 232) and/or the target position estimator 258 (e.g., to estimate the position of an RWO). The control system 220 may send and receive signals via the link 227. In example operation, the control system 220 sends via the link 227 a command to lase a RWO or point on a RWO ("lase command"). The RWO or point on the RWO being lased may be referred to as a "target." A target could be a single point. For example, a target may be a man-sized target, defined by NATO as 0.5 m×1.75 m/albedo 30%/visibility 10 km. A target may be multiple points. For example, a target may be a vehicle sized target, defined by NATO as 2.3 m×2.3 m/albedo 30%/visibility 10 km. Depending on the RWO and the conditions, the system 100 may utilize a single lase or multiple lase's to facilitate a quality consistent with use of a Kalman Filter threshold.

The control system 220 may transmit the lase command in response to receiving a command from the controller 151. The LRF 232 receives the lase command and responds by transmitting a laser. The LRF 232 detects the laser's reflection from the target and measures the time-of-flight for the laser to calculate a distance from the LRF 232 to the target. The LRF 232 may transmit the time-of-flight measurement and/or distance measurement to the control system 220, which may transmit one or both of the measurements to the controller 151.

The control system 220 may generate data representing a real-world position of the target. For example, the control system 220 may generate data representing a position for the target utilizing three factors: a known position of the surveyor 101, an orientation of the LRF 232 relative to the orientation of the surveyor 101, and a distance between the surveyor 101 and the target.

The controller 151 and/or the control system 220 may generate an anchor point corresponding to the position of the target. Further, the controller 151 and/or control system 220 may generate multiple anchor points and lines corresponding to positions of multiple targets (e.g., selected by a user of the controller 151 or selected autonomously). The multiple anchor points and lines may form a shape. The controller 151 and/or control system 220 may measure and analyze the spatial dimensions of the lines and/or shapes. The spatial dimensions may be provided to a user of the controller 151 in real-time, enabling the user to quickly evaluate, e.g., the size of a RWO recorded by the surveyor 101.

Other Aspects of the Surveyor 101

In some embodiments, the surveyor 101 may be a handheld device. In such embodiments, the surveyor 101 may move within the real-world environment by way of a person carrying and positioning the surveyor 101 to collect spatial data relating to RWOs.

In an embodiment, the vehicle 210 includes an energy source for one or more of the propulsion system 212, sensors 218, camera 231, and control system 220. For example, depending on the embodiment, the vehicle 210 may include a battery pack, solar panels, and/or gas and a gas engine. In an embodiment, the vehicle 210 does not include any position or motion sensors 218.

In an embodiment, the control system 220 includes two or more independent or semi-independent control systems. For example, a first control system may control the vehicle 210 and a second control system may control the payload 230.

In an embodiment the camera 231 is always on. In an embodiment, the camera 231 is responsive to movement of the controller 151. For example, the controller 151 may be or include a headset, and the camera 231 may be responsive to head gestures detected by the headset.

In an embodiment, the control system 220 is autonomous and does not activate the camera 131 in response to commands from the controller 151. That is, rather than relying on the capture command from the controller 151, the control system 220 may rely on internal logic to determine when to transmit the activation command to the camera 131.

In some embodiments, the payload 230 may include other means for obtaining measurements regarding points in the real-world environment. For example, the payload 230 may include infrared sensors or ultraviolet sensors, each of which may facilitate measurements outside of the visible spectrum. Infrared sensors may facilitate the surveyor 101 analyzing gas. For example, the surveyor 101 may employ Fourier transform infrared spectroscopy (FTIR) to obtain an infrared spectrum of absorption or emission of a solid, liquid, or gas.

Components of the Controller 151

Figure 3:
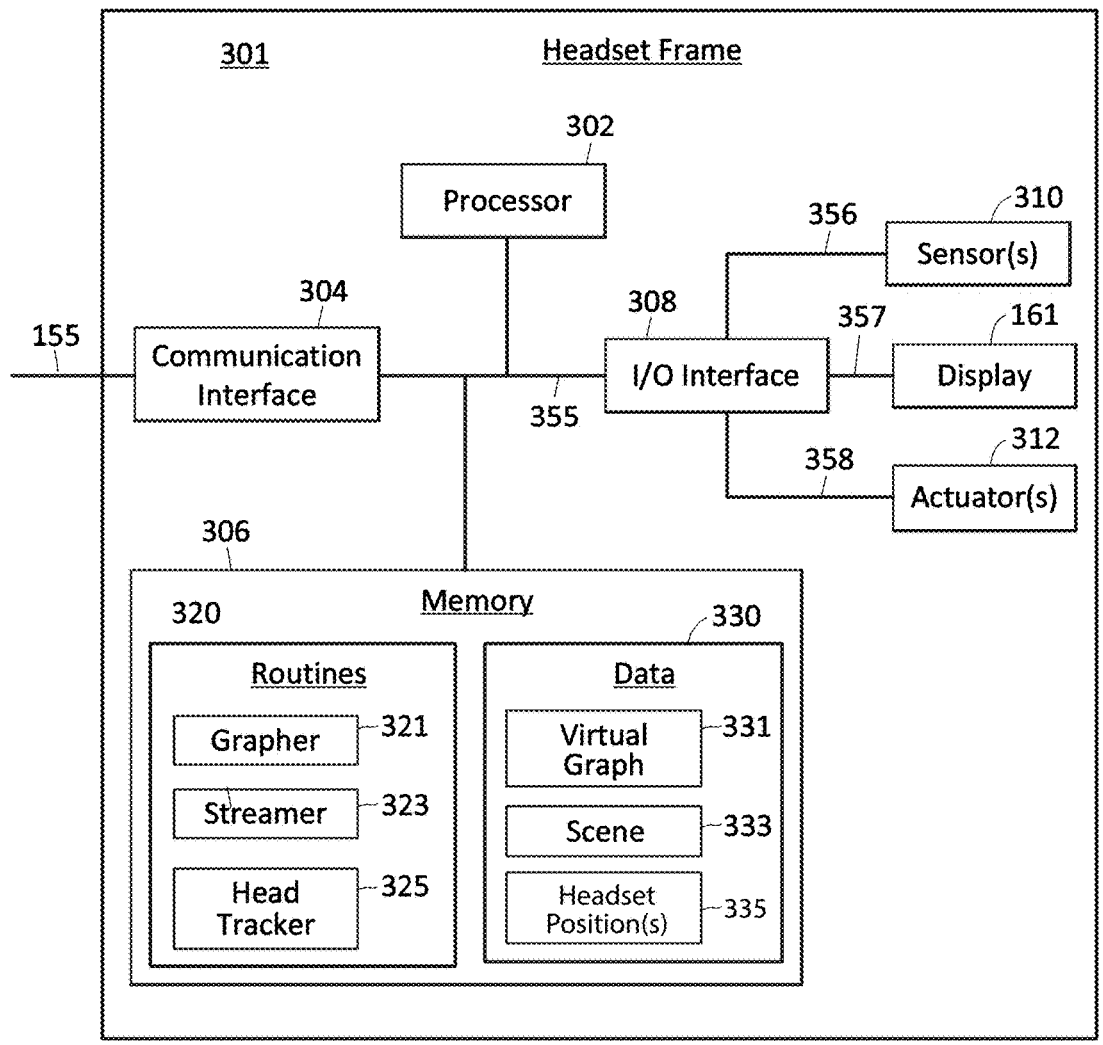
FIG. 3 is a block diagram of a controller according to an embodiment.

FIG. 3 is a block diagram of the controller 151 according to an embodiment. The controller 151 includes a headset frame 301. The headset frame 301 may include a processor 302, a communication interface 304, a memory 306, an I/O interface 308, one or more sensors 310, a display 161 (also shown in FIG. 1), and one or more actuators 312 (e.g., buttons, keys, directional-pads, touch interfaces, etc.).

The memory 306 may include one or more routines 320 and data 330. For example, the memory 306 includes a grapher routine 321, a streamer routine 323, and a head tracker routine 325. When executed by the processor 302, the grapher 321 causes the processor 302 to generate a virtual graph comprising one or more anchor points, lines, and/or shapes. The generated virtual graph may be stored to the memory 306 as virtual graph data 323. When executed by the processor 302, the streamer 323 causes the controller 151 to coordinate with the surveyor 101 to display at the display 161 images or video captured by the surveyor 101. When displaying captured video or images in real-time, it may be said that the streamer 323 coordinates with the surveyor 101 to stream video from the surveyor 101 to the display 161. The displayed video or image may be saved as scene data 333. When executed by the processor 302, the head tracker 305 causes the processor to track head movement (based on data from one or more sensors 310) of a user wearing the headset frame 301. Position and/or orientation of the headset frame 301 may be saved as position data 335. As an example, the position data 335 may represent a position and/or orientation list for the headset frame 301, wherein each entry in the list corresponds to a particular time at which position and/or orientation was captured.

The functionality of the routines 320 may be provided by a single routine in some embodiments. Further, the functionality of each routine 320 may be divided among multiple routines or subroutines not shown in FIG. 3. In an embodiment, one or more of the routines 320 are implemented by way of application specific hardware modules (e.g., ASICs) rather than by routines executed by the processor 302.

In an embodiment, one or more of the components 302-312 and 161 may be enclosed within a casing of the headset frame 301 such that the controller 151 is completely contained within a headset capable of resting on a user's head.

The processor 302 is communicatively connected to the communication interface 304, the memory 306, and the I/O interface 308 via the bus 355. The sensors 310, display 161, and actuator 312s are communicatively connected to the I/O interface 308 via the links 356, 357, and 358, respectively. The sensors 310 may include movement and/or position sensors, such as accelerometers, gyroscopes, magnetometers, altimeters, GPS, RTK, etc., and may be mounted on or within the headset frame 301 to track a movement and/or position of the headset frame 301. The communication interface 304 may be communicatively connected to the surveyor 101 shown in FIGS. 1 and 2 via the link 155, which may be wireless.

Example Operation of the Controller 151

The controller 151 serves a number of purposes: (i) commanding the surveyor 101 to capture images and/or video, (ii) tracking movement of the headset 301, (iii) displaying the images and/or video captured by the surveyor 101, and (iv) generating and displaying a virtual graph (e.g., anchor points, lines, and/or shapes) in response to input at the actuators 312.

First, to command the surveyor 101 to capture images and/or video, the controller 151 may implement the streamer 323. The controller 151 may transmit via the link 155 a capture command to the surveyor 101. The capture command may be sent in response to detecting user input via an actuator 312. In example operation, the I/O interface 308 receives a signal via the link 358 indicating that an actuator 312 has been actuated (e.g., by a user). The I/O interface 308 passes the signal to the processor 302. The processor 302 responds to the actuation by transmitting a capture command via the communication interface 304 and the link 155 to cause the surveyor 101 to capture an image or video.

Figure 8:
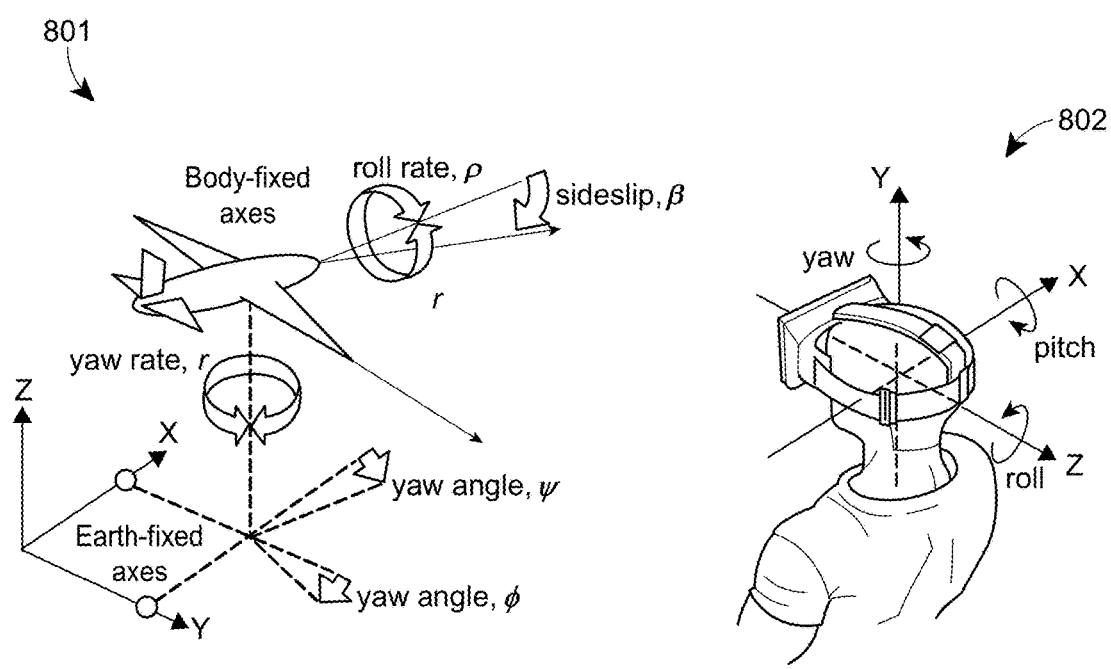
FIG. 8 depicts a vehicle referenced to earth fixed axes, and a controller and multiple degrees of freedom about which the controller may move and/or rotate according to an embodiment.

Second, to track movement of the headset 301 (and thus head movement of a user wearing the headset 301), the controller 151 may implement the head tracker 325. In example operation, one or more of the sensors 310 may respond to movement of the headset 301 by transmitting to the processor 302 data indicating position and/or movement data (referred to collectively as "headset orientation data," and may be saved as the headset position data 335). The headset orientation data may include data representing an absolute position. The headset orientation data may include data representing movement in one or more degrees of freedom (e.g., forward/backward position, up/down position, left/right position, forward/backward movement, up/down movement, left/right movement, pitch rotation, roll rotation, yaw rotation, and/or orientation relative to true and/or magnetic north). FIG. 8 depicts three earth fixed axes along which the controller 151 may move and/or change orientation.

The headset orientation data transmitted by the sensors 310 may include data representing both magnitude and direction of movement. The processor 302 may respond to receiving the headset orientation data by transmitting via the communication interface 304 and link 155 a command to update the orientation of the camera 131 of the surveyor 101 ("camera orientation command"). The surveyor 101 may respond to the camera orientation command by adjusting the camera 131 accordingly and transmitting video or images (to the controller 151) captured by the camera 131 from the new orientation. The controller 151 may display (e.g., by implementing the streamer 323) the updated video/image at the display 161. As a result, the display provided at the display 161 is responsive to movements of the headset frame 301, and thus responsive to head movements of a user wearing the headset frame 301.

Third, as noted, the controller 151 may display images and/or video captured by the surveyor 101. The controller 151 may display the images and/or video by implementing the streamer 323. The controller 151 may transmit a capture command to the surveyor 101. The surveyor 101 may respond to the capture command by capturing images or video and transmitting an image signal to the controller 151 via the link 155. The controller 151 receives the image signal at the communication interface 304. The processor 302 detects the image signal received at the communication interface 304 and causes the display 161 to display the image or video represented by the image signal. Accordingly, a user viewing the display 161 can view the real-world scene captured by the surveyor 101. In some embodiments, the user can view the image or video in real-time.

Fourth, the controller 151 may generate and display a virtual graph (e.g., anchor points, lines, and/or shapes) in response to input at the actuators 312. Generating and displaying the virtual graph may involve implementing the grapher routine 321. In example operation, an actuator 312 may be actuated (e.g., by a user) while the display 161 is displaying a video image. The processors 302 may detect this actuation and respond by generating an anchor point, line, and/or shape. Generating an anchor point may include the processor 302 transmitting a lase command to the surveyor 101 via the communication interface 304 and link 155. The surveyor 101 may receive the lase command and lase a target. The surveyor 101 may then transmit to the controller 151 position data for the target. The controller 151 may associate this position data with the anchor point. The anchor point may be stored to the memory 306 as the virtual graph data 331. For example, an anchor point "Anchor_1" may be stored to memory and associated with "Position_1," wherein "Position_1" includes or references latitude coordinates, longitude coordinates, and/or an elevation/altitude measurement, for example.

To further illustrate, a first actuation may cause the processor 302 to generate a first anchor point. Position data for the first anchor point may be obtained by communicating with the surveyor 101 as described above. A second actuation may cause the processor 302 to generate a second anchor point. In some instances, the processor 302 may also generate a line between the first and second anchor point. A third actuation may cause the processor 302 to generate a third anchor point. In some instances the processor 302 may generate a line between the third and second anchor point. In such instances, a fourth actuation may cause the processor 302 to draw a line from the third anchor point to a first anchor point, forming a triangle. A similar process may be carried out to form any of a number of shapes including anchor points as vertices. The virtual graph including the anchor points, lines, and/or shapes may be stored to the memory 306 as virtual graph data 331.

In an embodiment, the virtual graph data 331 is synchronized with the scene data 331. For example, the virtual graph data 331 and scene data 331 may be time-stamped, enabling the video or image represented by the scene data 331 to be replayed with the corresponding virtual graph that was generated while the scene was displayed.

In some instances, an actuator 312 may be actuated and the processor 302 may respond to the actuation by removing a previously generated anchor point, line, and/or shape.

Other Aspects of the Controller 151

In an embodiment, the controller 151 includes a single actuator 312. In such an embodiment, the processor 302 may distinguish between various types of user input based on length of input, for example (e.g., a long press may cause the surveyor 101 to start or stop capturing a scene, and a short press may cause the controller 151 to generate an anchor point).

In some embodiments, one or more of the components 302-312 and 161 may not be included in the headset frame 301. For example, in an embodiment the headset frame includes only the display 161 and the sensors 310.

In an embodiment, the system 100 includes the surveyor 101 but not the controller 151. In such an embodiment, the surveyor 101 may operate autonomously or semi-autonomously.

In an embodiment, the controller 151 only communicates with the surveyor 101 when line-of-sight is maintained between the controller 151 and the surveyor 101. The controller 151 and/or surveyor 101 may be configured to be compliant with Federal Aviation Administration (FAA) regulations. In an embodiment, the controller 151 is capable of communicating with the surveyor 101 regardless of whether line-of-sight is maintained. Communication beyond line of sight ("BLOS") may be enabled via various networks for command/control/data I/O (cellular, satellite, ISM, etc.).

In some embodiments, the system 100 includes a fail-safe mode for BLOS. The fail-safe mode may rely on constant contact with a network (for example—cellular). The system 100 may examines a RSSI (Received Signal Strength Indicator) and/or BER (Bit Error Rate) to determine the quality of wireless communications. Based on its recent history of the RFI/EMI environment it's operating in, the surveyor 101 can continue its mission in a challenging and/or remote environments where the surveyor 101 is BLOS relative to the controller 151.

Example Methods and Aspects

Figure 4:
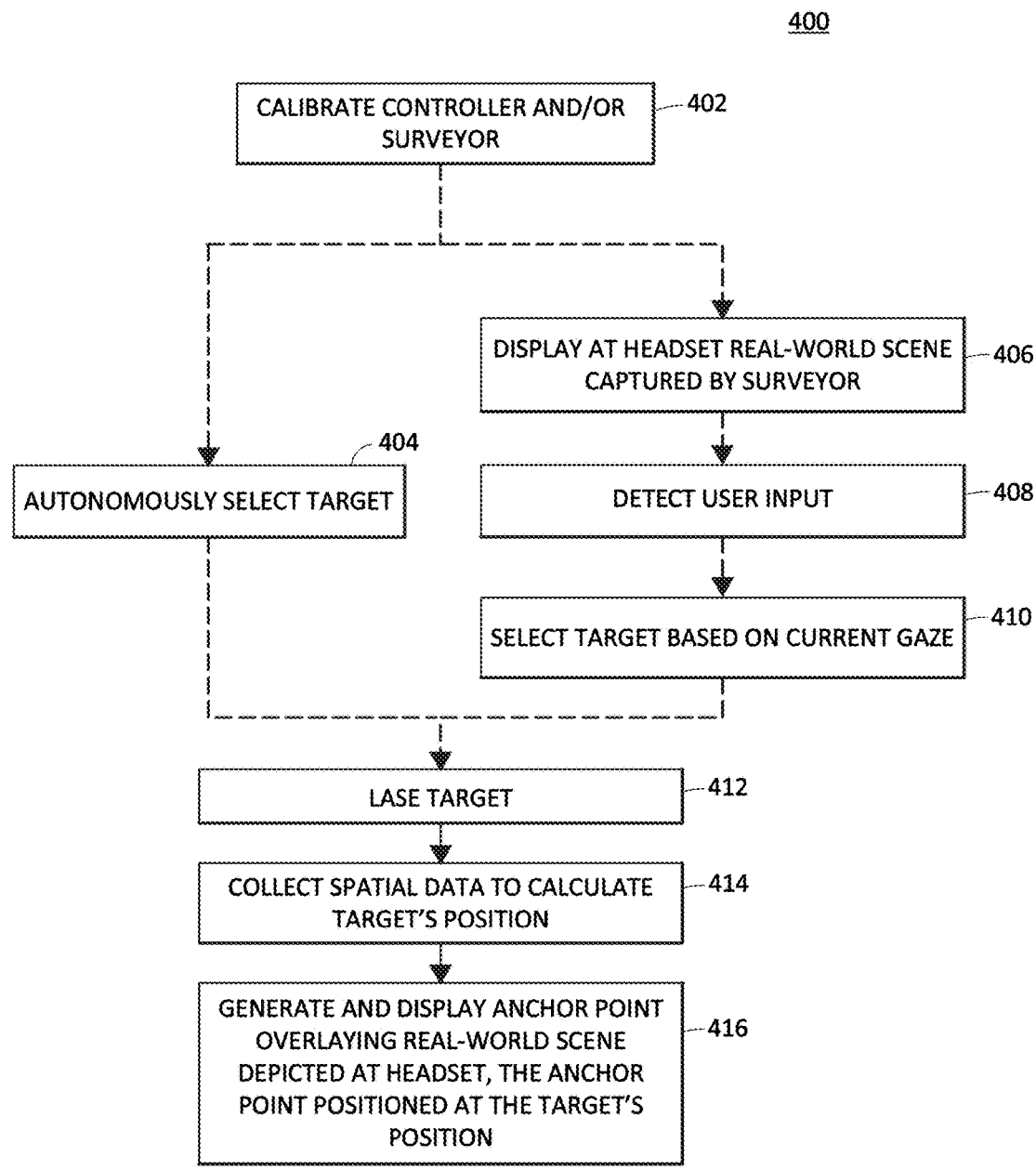
FIG. 4 is a flow chart of an example method of displaying a virtual graph comprising an anchor point according to an embodiment.

FIG. 4 is a flow chart of an example method 400 of displaying a virtual graph comprising an anchor point according to an embodiment. The method 400 may be implemented, in whole or in part, by the system 100 shown in FIG. 1, and more particularly, by the surveyor 101 and/or the controller 151 shown in FIGS. 1-3. The method 400 may be saved as a set of instructions, routines, programs, or modules one or more memory devices, and may be executed by one or more processors or controllers.

The method 400 begins when a controller and/or surveyor are calibrated (block 402). Calibrating the surveyor 101 may include determining one or more projection angles associated with the LRF 232. For example, the LRF 232 may be aimed 30 degrees down from the horizontal plane on which the surveyor 101 is oriented and 0 degrees left or right from a vertical plane on which the surveyor 101 is oriented (i.e., the LRF 232 may be aimed straight ahead and down relative to the current orientation of the surveyor 101). The surveyor may utilize these projection angles and a measured time-of-flight (which can be utilized to determine a distance from the LRF 232 to a target) to calculate an estimated position of a target.

Calibrating the controller 151 may include identifying an area of focus corresponding to a gaze of a user utilizing the controller 151. When the controller 151 is or includes a headset, for example, sensors within the headset relay information relating to multiple degrees of freedom (e.g., position, movement, and/or orientation information) to the surveyor 101. In turn, the surveyor 101 moves sensors in correlation with the user's gaze. This may be a different azimuth/elevation/skew from the surveyor 101.

In an embodiment, a target is autonomously selected (block 404). This may be referred to as "autonomous target selection." The control system 220 of the surveyor 101 may include a memory storing one or more autonomous target selection routines that, when executed by a processor of the control system 220, cause the control system 220 to autonomously select a target from an image or video captured by the camera 131. For example, the autonomous target selection routines may be configured to implement various image processing and feature recognition techniques, enabling the surveyor 101, for example, to identify corners, edges, and deformations of various RWOs depicted in captured images or video.

The surveyor 101 may implement autonomous target selection by utilizing an "environment data set" available to the surveyor 101 (e.g., stored by a memory of the control system 220). The environment data set may include a 3D map of the terrain, features, RWOs, etc., within an area of interest. The environment data set may include data regarding an example of a T-72 (e.g., data regarding height, width, color, location, etc. of an example T-72). A current "lase" may be filtered for any RWO that is comparable to the target in question using techniques such as SLAM ("Spatial Log-Euclidian Appearance Model"). SLAM offers a number of advantages due to global and local spatial property preservation and robustness. For example, SLAM can offer a number of advantages pertaining to color space preservation, illumination challenges, motion/pose changes, partial occlusions of image, etc. For a discussion of SLAM, see X. Li, et al, pp 400-407 "Robust Visual Tracking based on an Effective Appearance Model" et al, from proceedings "Computer Vision—ECCV 2008: $10^{th}$ European Conference on Computer Vision, edited by David Forsyth, et al.

In an embodiment, a target is selected by a user (blocks 406-410). This may be referred to as "manual target selection." For manual target selection, the display 161 of the controller 151 displays an image or video of a real-world scene captured by the camera 141 of the surveyor 101 (block 406). While the image or video is displayed, the controller 151 may detect user input (block 408). User input may be detected by way of detecting actuation of an actuator 312. In response to the detected user input, a target is selected from the displayed image or video. The target may be whatever the user happens to be looking at. For example, if the user is viewing a forest, the controller 151 may select as the target a tree that is the focus of the user's gaze. If the user is looking at a bridge column, the controller 151 may select as the target the area of the bridge that is the focus of the user's gaze.

In some embodiments, a target is selected utilizing some combination of autonomous target selection (block 404) and manual target selection (blocks 406-410). This may be referred to as "semi-autonomous target selection." For example, an image may be presented to a user for target selection. Pre-selected targets may be designated with illuminations in order to highlight them from the background scene. The user may validate the pre-selection, add or subtract targets as needed, etc. In short, regardless of the precise method, a target depicted by the displayed image or video may be selected.

Once the target has been selected, the target is lased (block 412). The LRF 232 may be activated in response to a command from the control system 220 and/or in response to a command from the controller 151 (e.g., the control system 220 may command the LRF 232 to lase a target in response to a command received from the controller 151).

Spatial data is collected and used to calculate the target's position (block 414). The collected spatial data may include: (i) data representing a position of the surveyor 101 in three dimensions (e.g., latitude, longitude, and elevation/altitude) (ii) a relative orientation or projection angle of the LRF 232, and (iii) a distance from the LRF 232 to the target. The distance from the LRF 232 to the target may be obtained by measuring a time-of-flight between a first time at which the LRF 232 is fired and second time at which a reflection of the fired laser is detected by the LRF 232. Because the speed of light is known, this time-of-flight measurement can be used to calculate a straight-line distance from the LRF 232 (and thus from the surveyor 101) to the target reflecting the laser. Based on the position of the surveyor 101, the projection angle of the LRF 232, and the distance between the surveyor 232 and the target, the target's position can be calculated by the surveyor 101 and/or controller 151.

After the target's position is calculated, an anchor point is generated and displayed (block 416). The anchor point may be generated by the surveyor 101 or by the controller 151. In an embodiment, the surveyor 101 transmits a position to the controller 151 and the controller 151 associates the position with the generated anchor point. A visual indicator representing the anchor point may be displayed by the controller 150. The anchor point may be saved to memory.

FIG. 5 is a flow chart of an example method 500 of calibrating a surveyor according to an embodiment. The method 500 may be implemented, in whole or in part, by the system 100 shown in FIG. 1, and more particularly, by the surveyor 101 and/or the controller 151 shown in FIGS. 1-3. The method 500 may be saved as a set of instructions, routines, programs, or modules to one or more memory devices, and may be executed by one or more processors or controllers.

The method 500 begins when a surveyor is moved to a first position (block 502). The surveyor 101 may be moved to the first position in response to a command from the controller 151. A human operating the controller 151 may cause the controller 151 to send the command. For example, the human may actuate an actuator 312 (e.g., a direction pad or joystick that may exists on the headset frame 301 or on a handset of the controller 151 in certain embodiments) that results in the controller 151 sending the command. In an embodiment, the surveyor 101 moves to the first position in response to a command from an autonomous vehicle control routine or module implemented by the surveyor 101.

A real-world position and/or orientation of the surveyor may be obtained (block 504). For example, the surveyor 101 may obtain its position utilizing the sensors 218 shown in FIG. 2. For example, the surveyor 101 may obtains its position and/or orientation utilizing a global positioning system (GPS) receiver, an accelerometer, a gyroscope, a compass, etc. The position may be represented by coordinate positions in three-dimensional space.

The surveyor may lase a reference having a known position (block 506). For example, the surveyor 101 may lase a reference utilizing the LRF 232. The reference may be any RWO having a known position. For example, a RWO may have geodata (e.g., geographical tags and/or reference datum) accessible via a network.

An estimated position of the reference may be calculated (block 508). For example, the LRF 232 may detect a reflection from the projected laser and may measure a time-of-flight for the laser. The surveyor 101 may obtain a distance measurement based on this time-of-flight measurement. The surveyor 101 may estimate the position of the reference using: (i) a known or estimated orientation of the LRF 232 relative to the surveyor 101; (ii) the position of the surveyor 101; and (iii) the obtained distance from LRF 232 to the reference.

The estimated position of the reference may be compared to the known position of the reference (block 510). For example, the surveyor 101 may compare the estimated position to the known position of the reference. In an embodiment, the controller 151 may compare the estimate position to the known position of the reference.

Compensation data may be derived based on the comparison (block 512). For example, for a given straight-line distance between the surveyor 101 and a target, a vertical and/or horizontal correction may need to be applied to an estimated position. Blocks 510 and 512 may be implemented using a Kalman filter in an embodiment. That is, the surveyor 101 may estimate the position of the reference (block 510) and compare that estimate with the known position (block 512). After making the comparison, the model used to estimate the position may be updated based on the error between the estimate and known position, and may converge on an updated solution.

Figure 6:
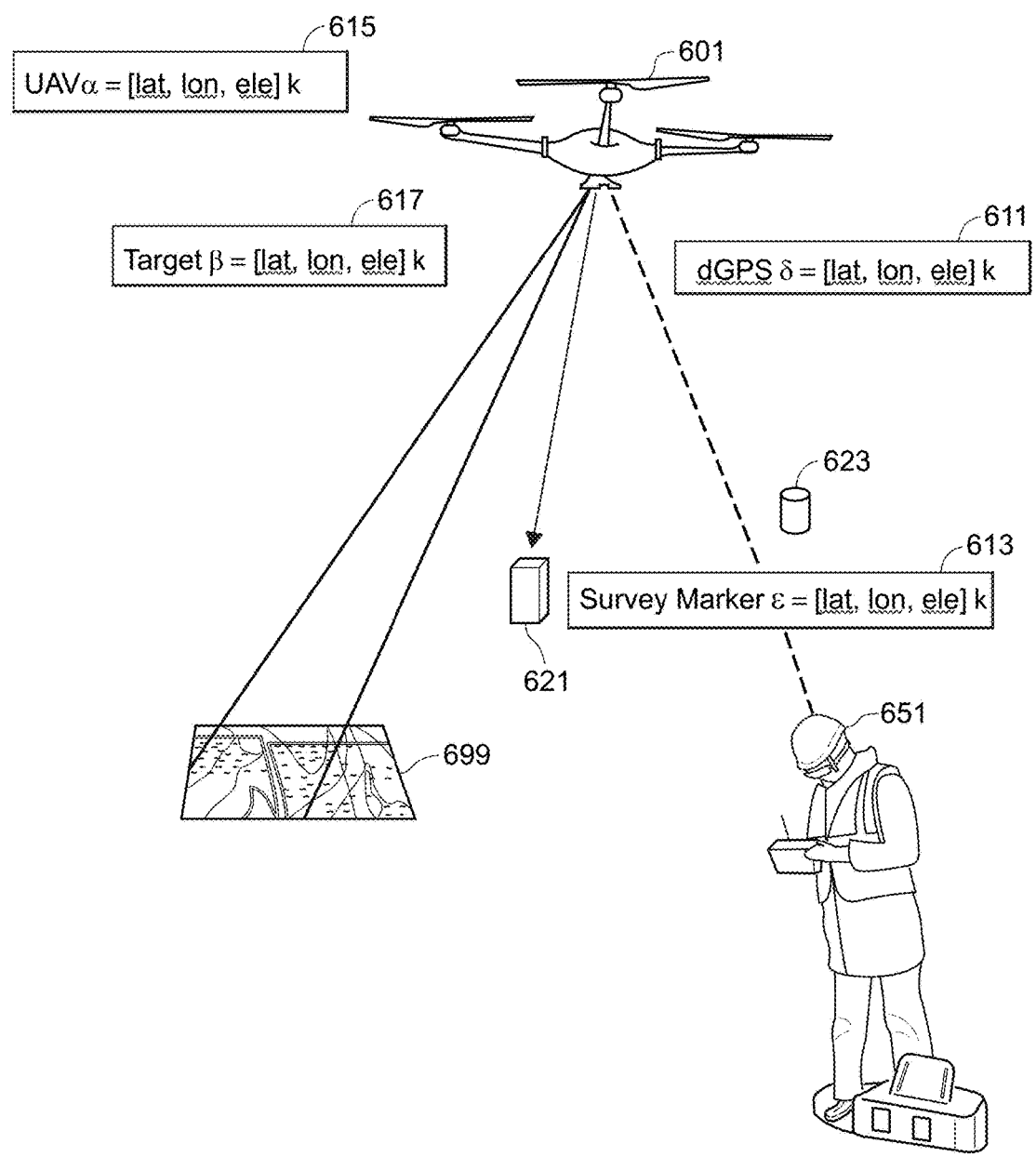
FIG. 6 depicts a surveyor, a controller worn by an operator, and an area of interest according to an embodiment.

FIG. 6 depicts a surveyor 601, a controller 651 worn by an operator, and an area of interest 699 according to an embodiment. FIG. 6 also depicts GPS positions 611, UAV positions 615, target positions 617, a survey marker 621, and an differential GPS beacon 623 corresponding to the GPS position 611.

The surveyor 601 may be tasked to take real-time survey measurements on a plot of real estate (or infrastructure, pipe lines, etc.). The operator may use the controller 651 (which is a headset in an embodiment) for display, target selection, command and control. The surveyor 601 may be dispatched to the general location at a safe altitude and manner of flight. The surveyor 601 may activate a laser range finder/designator to co-locate and designate specific datum that coincides with known GPS reference points, and becomes oriented and calibrated. It may map the area of interest 699 by lasing the outline and boundary. Each lase may be calibrated and compensated using an embedded GPS and/or IMU (Inertial Measurement Unit), thereby establishing relative and absolute datum for each lased target. An example of absolute datum is GPS lat/lon/el [41° 52'44.0"N 87° 38'09.4"W 353'MSL]. An example of relative datum is [+2.114 meters North, −1.032 meters West, +0.185 meters elevation]. In an embodiment, the absolute datum (for each target) is preferred, but not always available. In an embodiment, relative datum is used instead of absolute datum.

The location variance of the surveyor 601 may be removed from the target object, due to wind, drift, or operator error; dramatically improving the accuracy and precision. The target object's computed data then may be displayed at the controller 651 for the operator, and/or communicated and remotely stored. In some circumstances, the surveyor 601 is not a stationary platform where stability can be utilized; it may be in motion relative to one or more axes. Further, the target may be stationary or in motion. When the target is stationary, motion correction only needs to account changes in position or motion of the surveyor 601. When the target is non-stationary or mobile, each lase can be considered a measurement of a target that is "stationary" when considered within a small time-frame (i.e., the target can only move a very discreet amount based on a "fast lase" that occurs at the speed of light). Multiple lase's of the target will determine the eigenvector of the target. The eigenvector may be utilized in the linear transform removal of the surveyor 601's motion, allowing the surveyor 601 and/or controller 651 to obtain the target's motion.

The surveyor 601 may be used to establish distance, position, location, area, volume, velocity, acceleration, and a host of other measurements. For example, to establish the relative velocity vector of a military convoy, the surveyor 601 may continuously lase for 2-3 seconds, calibrate and compensate the data relative to the platform. The surveyor 601 may compute and communicate the direction and magnitude of the convoy. Overlaid map data layers (e.g., retrieved from an on-board or remote source) may show estimated time of arrival at a specific location.

In an embodiment, the surveyor 601 and controller 651 may implement three functions: (i) establishing absolute position; (ii) calibrating the system; and (iii) computing the target object's data.

1—Establishing Absolute Position: The surveyor 601 may be tasked to take measurements and arrive at its general location taking GPS and/or IMU data to establish absolute reference data points, and way points. Upon arrival, a differential GPS or a survey marker (if available) may be stored. If unavailable, then a nearby real object (such as road, waterway, etc.) that has geodata may be substituted. An LRF may be activated, lasing an absolute reference data point, at time k. The LRF raw data may be put through a Kalman Filter, then stored as compensation data of the platform independent of the target. Multiple measurements may be made to improve accuracy and filter performance (k, k+1, k+2, etc.). For example, UAV (referring to the surveyor 601 in this instance) $\alpha_=[lat, lon, ele]_k$, Target $\beta_=[lat, lon, ele]_k$, dGPS $\delta_=[lat, lon, ele]_k$, Survey Marker $\varepsilon_=[lat, lon, ele]_k$.

2—Calibrating the System: A target object may be selected for measurement, either interactively via the controller 651, or pre-programmed into the surveyor 601. An LRF on the surveyor 601 may activate at time k, and take measurements on the target object. The LRF raw data may be put through a Kalman Filter. These filtered measurements may be compensated with surveyor 601 reference data from step 1. The Kalman filter improves the signal to noise ratio on the sensor set. The surveyor 601 reference data may contain "known" GPS coordinates which have been gathered from benchmarks, land marks, etc. Defining these "differences" then storing the "offsets" (which will be applied to subsequent measurements) may result in the calibration of the system. Multiple measurements may be made to improve accuracy and filter performance (k, k+1, k+2, etc.).

3—Computing the Target Object's Data: In an embodiment, true position and motion of the target is obtained by correcting for the surveyor 601's motion. Correcting the surveyor 601's motion may involve performing a linear transform of the LRFs "corrected" datum (filtered and calibrated) with eigenvector. This ensures the target integrity is not corrupted into perspective or other non-optimized isometric's. Target integrity generally refers to the need to ensure that the laser return signal is valid, not corrupted, not distorted, not hitting an unintended target, etc. Target integrity may be especially important when the surveyor 601 is utilized in less than ideal environmental conditions (e.g., rain, sleet, gloom of night, etc.). Non-Optimized isometrics are a "skew" in the target's datum, which may distort the laser image and lead to corrupted datum.

Subsequent LRF lasings may be taken on an individual basis for compensation, calibration, and/or ultimate computation of the target object's latitude, longitude, and elevation. The laser may be AC coupled at 10 Hz. Each "lase" by the LRF may be treated as an individual measurement. These individual lases may be stacked up for coherence and may be filtered.

The target object's data (e.g., the coordinates) may be displayed, compensated and calibrated, within the controller 651 environment in real-time, or stored remotely in some instances. Further, in some embodiments the controller 651 may display size, shape, distance, position, velocity, acceleration, area, volume, etc.

As already noted, FIG. 7 depicts three axes along which a vehicle 700 may move and/or change orientation. The vehicle 210 shown in FIG. 2 may be similar to the vehicle 700 in some embodiments, and may similarly be free to move and/or rotate along the three axes. The surveyor 101 may track position, movement, and orientation of the vehicle 210 in one, multiple, or all degrees of freedom (e.g., forward/backward position, up/down position, left/right position, forward/backward movement, up/down movement, left/right movement, pitch rotation, roll rotation, yaw rotation, and/or orientation relative to true and/or magnetic north).

As already noted, FIG. 8 depicts three earth fixed axes along which a controller 802 may move and/or change orientation according to an embodiment. The controller 151 may be similar to the controller 802 in some embodiments, and may track its position, movement, and/or orientation along the three earth fixed axes. The controller 151 may communicate with the surveyor 101 to display video or images in accordance with the position, movement, and/or orientation.

Figure 9:
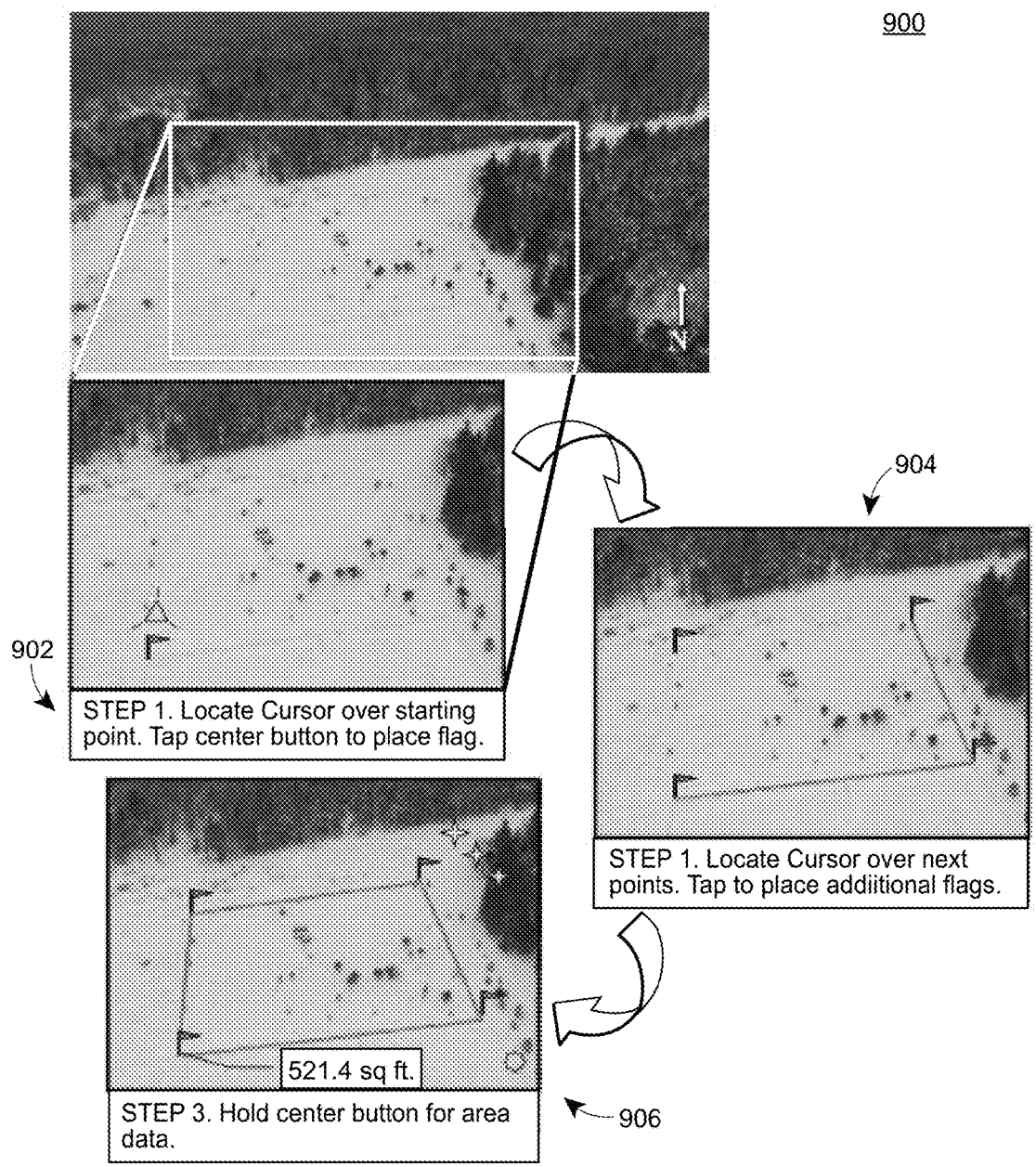
FIG. 9 depicts a method for generating and displaying a virtual graph according to an embodiment.

FIG. 9 depicts a method 900 for generating and displaying a virtual graph according to an embodiment. The method 900 may be implemented by the controller 151 and/or surveyor 101.

In step 1 (block 902), the controller 151 may detect a cursor and/or a center of focus. The controller 151 may detect that an actuator (e.g., a center button) has been actuated. In response, the controller 151 may place a visual indicator (e.g., a flag in this case) at the spot corresponding to the cursor's position or to a position at the center of focus.

In step 2 (block 904), the controller 151 may detect that cursor is located in a new spot, or that a center of focus is in the new spot. The controller 151 may detect an actuation, and may place a visual indicator (e.g., a flag in this case) at the new spot(s).

In step 3 (block 906), the controller 151 may detect an actuation after a shape has been formed (e.g., a long press of a button in this case). In response to the actuation, the controller 151 may calculate and display an area for the shape.

Figure 10:
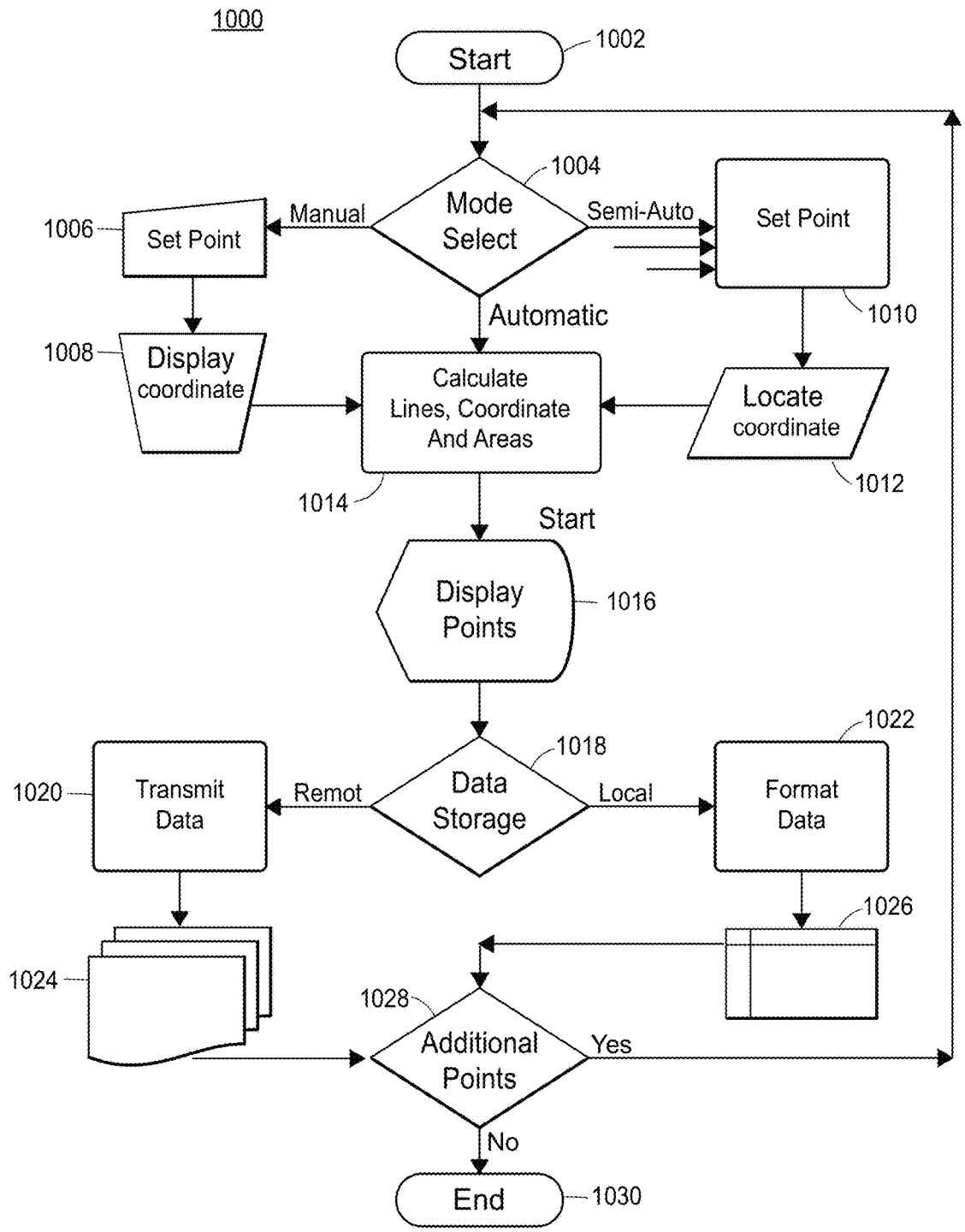
FIG. 10 is a flow chart of an example method of controlling a surveyor according to an embodiment.

FIG. 10 is a flow chart of an example method 1000 of controlling a surveyor according to an embodiment. The method 1000 may be implemented, in whole or in part, by the system 100 shown in FIG. 1, and more particularly, by the surveyor 101 and/or the controller 151 shown in FIGS. 1-3. The method 1000 may be saved as a set of instructions, routines, programs, or modules to one or more memory devices, and may be executed by one or more processors or controllers.

The method 1000 begins when a start command is received (block 1002). For example, the controller 151 may receive a start command via an actuator 312.

A mode selection may be received (block 1004). For example, the controller 151 may detect an actuation of an actuator 312 indicating selection of a mode. Modes may include: manual mode; automatic or autonomous mode; and semi-automatic or semi-autonomous mode. If manual mode is selected, block 1006 may follow block 1004. If automatic mode is selected, block 1014 may follow block 1004. If semi-automatic mode is selected, block 1010 may follow block 1004.

A set point may be received in manual mode (block 1006). A set-point may be an area of focus that has not yet been selected as an anchor point. As another example, a set point may be an area over which a cursor is hovering. For example, the controller 151 may detect actuation of an actuator 312. As another example, the controller 151 may determine (e.g., based on data from the sensors 310) that a user is focusing on a particular area or point. Coordinates for the area or point may be displayed (block 1008). That is, the controller 151 may cause the surveyor 101 to lase a target and to obtain coordinates for the target. The coordinates may be displayed.

A set point may be received in semi-automatic mode (block 1010). Coordinates may be located (block 1012). For example, in semi-automatic mode a command may be issued to the surveyor 101 to cause the surveyor 101 to select a RWO (e.g., a second tree left of a stream, next to a backyard fence). Starting at that RWO, the surveyor 101 may measure the area encompassed by that backyard fence. The surveyor 101 may be commanded to fly to a particular location (e.g., [41° 52'44.0"N 87° 38'09.4"W]; ie. 10' north, and 3' west). The surveyor 101 may then fly to these coordinates, search an online database to match an image with a semi-automatic mode command set (e.g., <START>—begin flight here—(and)—do these tasks (including validation)—(and)—return to your point of origin when completed-<END>).

In automatic mode, a surveyor may identify targets and position coordinates for these targets without any input from a user (e.g., without an actuation of an actuator 312 of the controller 151).

An anchor point may be generated and displayed (block 1016). For example, the controller 151 may detect an actuation of an actuator 312, and may respond by generating and displaying an anchor point.

The anchor point may be stored to memory (block 1018). A decision may be made by the controller 151 and/or surveyor 101 as to whether the anchor point should be stored remotely or locally.

If a decision is made to store the anchor point remotely, data may be transmitted (block 1020) and stored at a server (block 1024).

If a decision is made to store the anchor point locally, the data may be formatted (block 1022). For example, the data may be organized according to first-in-last-out procedures. The data may be formatted for storage and access by a flat file database. Sensor data may be stored in raw and compensated forms. The formatted data may be stored locally (block 1026).

In an embodiment, a user of the controller 151 may decide whether additional anchor points need to be generated (block 1028). In an embodiment, the surveyor 101 may make this decision. If additional anchor points need to be generated and displayed, block 1004 may follow block 1028. Otherwise, the method 1000 may end.

Figure 11:
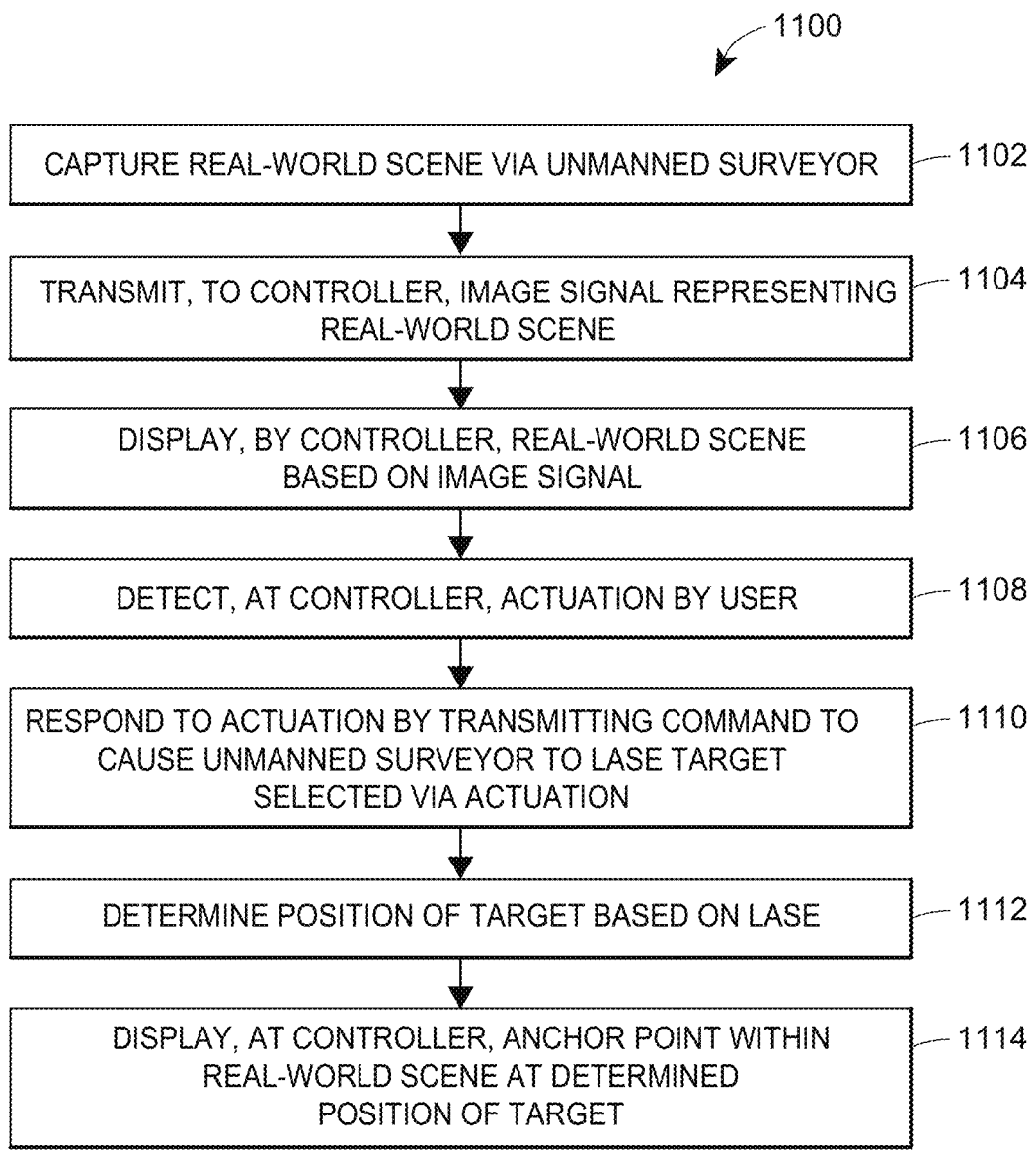
FIG. 11 is a flow chart of an example method of displaying an anchor point within a real-world scene according to an embodiment.

FIG. 11 is a flow chart of an example method 1100 of displaying an anchor point within a real-world scene according to an embodiment. The method 1100 may be implemented, in whole or in part, by the system 100 shown in FIG. 1, and more particularly, by the surveyor 101 and/or the controller 151 shown in FIGS. 1-3. The method 1100 may be saved as a set of instructions, routines, programs, or modules to one or more memory devices, and may be executed by one or more processors or controllers.

The method 1100 begins when a real-world scene is captured (e.g., via the camera 131) by the surveyor 101 (block 1102). The surveyor 101 may capture the real-world scene by capturing an image or series of images (e.g., video) in the visible spectrum and/or infrared spectrum. In some instances, the surveyor 101 may additionally capture audio.

The surveyor 101 may transmit via the link 155 to the controller 151 an image signal representing the captured real-world scene (block 1104). As already noted, the link 155 may be wireless. The image signal may be transmitted and received in real-time or near real-time.

The controller 151 may receive the image signal and, based on the received image signal, display (e.g., at the headset display 161) the real-world scene (block 1106). Displaying the real-world scene may include displaying a live or near live video of the real-world scene.

The controller 151 may detect that one of the actuators 312 has been actuated by a user (block 1108). The actuated actuator 312 may be a button on the headset frame 301. In an embodiment, the controller 151 may detect via a microphone an audio command from a user and may respond to the detected audio command instead of, or in addition to, responding to the actuation.

The controller 151 may respond to the detected actuation by transmitting a command to the surveyor 101 to cause the surveyor 101 to lase, via the LRF 232, a target selected via the actuation (block 1110).

The controller 151 may determine a position of the target based on the lase (block 1112). For example, the controller 151 may determine the position of the target based on a time-of-flight for a laser transmitted at the target and reflected back to the controller 151. Using the time-of-flight measurement, the controller 151 can calculate how far the target is from the surveyor 101. Based on a known position and orientation of the surveyor 151, the controller 151 may calculate the position of the target. In some instances, the surveyor 101 may perform some or all of the calculations necessary to determine the position of the target.

The controller 151 may display an anchor point positioned at the position of the target within the real-world scene displayed by the headset display 161. For example, if the determined position of the target is X (e.g., latitude), Y (e.g., longitude), Z (e.g., altitude), the controller 151 may generate the anchor point and may associate the anchor point with the position X, Y, Z. Accordingly, when the controller 151 displays the real-world scene, the anchor point will appear to be positioned at X, Y, Z. Even if the real-world scene changes (e.g., due to the surveyor 101 changing position and/or orientation), the anchor will appear to be fixed at position X, Y, Z.

In some instances, before capturing the real-world scene, the surveyor 101 is calibrated (e.g., using the method 500 shown in FIG. 5). Calibrating the surveyor 101 may include generating or updating a model of real-world distances relative to the surveyor 101. For example, the surveyor 101 may utilize a model that associates particular distances with particular time-of-flight measurements for lases fired by the LRF 232. To update this model, the surveyor 101 may obtain a known position and orientation of the surveyor 101 and a known position of a real-world object. The surveyor 101 may lase the real-world object and estimate the real-world object's position based on the model, the measured time-of-flight for the lase, and the position and orientation of the surveyor 101. The surveyor 101 and/or controller 151 may compare this estimate to the known position of the real-world object to obtain a model error, and may update the model based on the model error.

In some embodiments, the controller 151 may be calibrated by identifying an area of focus corresponding to a user's gaze. Based on this calibration, the controller 151 may accurately determine a target associated with a user's actuation of one of the actuators 312. That is, in some instances, the user can simply press a button, and the controller 151 "knows" which object in the real-world scene the user is targeting based on his or her known area of focus. The controller 151 can then generate an anchor point associated with this position.

Figure 12:
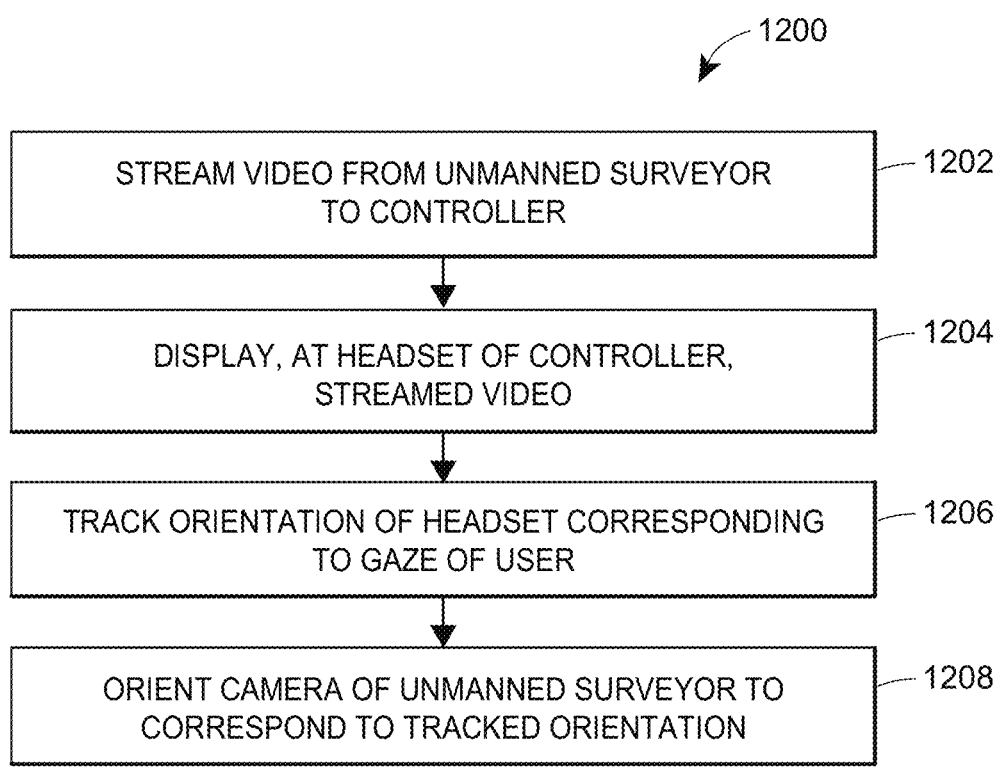
FIG. 12 is a flow chart of an example method of coordinating a headset of a controller with an unmanned surveyor according to an embodiment.

FIG. 12 is a flow chart of an example method 1200 of coordinating a headset of a controller with an unmanned surveyor according to an embodiment. The method 1200 may be implemented, in whole or in part, by the system 100 shown in FIG. 1, and more particularly, by the surveyor 101 and/or the controller 151 shown in FIGS. 1-3. The method 1200 may be saved as a set of instructions, routines, programs, or modules to one or more memory devices, and may be executed by one or more processors or controllers.

The method 1200 begins when the surveyor 101 streams video to the controller 151 (block 1202). The video may be streamed in real-time or near real-time.

The controller 151 may display at the headset display 161 the streamed video (block 1204). Displaying the streamed video may include providing a display with a 180 degree field of view.

The controller 151 may track an orientation of the headset frame 301 corresponding to a gaze of the user of the controller 151 (block 1206). The controller 151 may track the orientation of the headset frame 301 via one or more of the sensors 310, which may include position and/or orientation sensors such as accelerometers, gyroscopes, magnometers, altimeters, or GPS receivers. The controller 151 may track the orientation of the headset frame 301 in multiple degrees of freedom (e.g., position and/or movement forward and aft, position and/or movement up and down, position and/or movement side-to-side, and/or rotation around an X, Y, and/or Z axis, etc.). In some embodiments, the controller 151 may track orientation in only certain degrees of freedom, such as rotation around the Z axis (e.g., to track a user rotating his or her head left or right) and around the X axis (e.g., to track a user rotating his or her head up or down). In some instances, the controller 151 may be calibrated to set each axis relative to the front of the headset so that a user's straight-forward gaze is known relative to the orientation of the headset frame 301.

The surveyor 101 may orient the camera 131 to correspond to the tracked orientation of the headset frame 301 (block 1208). As a result, the camera 131 is positioned and oriented to capture images and/or video consistent with the user's gaze. For example, as a user of the headset frame 301 rotates his or her head left, the camera 131 may rotate left, giving the user the ability to "look around" the environment captured by the camera 131 by simply moving his or her head. This immerses the user within the captured environment and makes it very easy for him or her to control the camera 131. To orient the camera 131, the controller 151 may transmit to the surveyor 101 a desired orientation for the camera 131. In some instances, the controller 151 may transmit to the surveyor 101 the orientation of the headset frame 301, and the surveyor 101 may calculate the appropriate orientation for the camera 131.

In some embodiments, the camera 131 may rotate around multiple axes in response to the user rotating his or her head around multiple axes. Further, the surveyor 101 may move the camera horizontally or vertically in response to the user moving his or her head vertically or horizontally. In an embodiment, the vehicle 210 moves horizontally or vertically in response to the user moving his or her head vertically or horizontally. In an embodiment, the controller 151 includes a vehicle control interface for moving the vehicle 210. For example, the controller 151 may include a handheld device with one or more actuators (e.g., directional pads, touch interfaces, and/or "sticks") for moving the vehicle 210 in one or more degrees of freedom. In response to detecting an actuation of one or more of these actuators, the controller 151 may transmit (e.g., via the link 155) to the surveyor 101 movement-commands to cause the vehicle 210 to move in accordance with the detected actuations.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Hardware and Software

Certain embodiments are described as including logic or a number of routines, subroutines, applications, or instructions. These embodiments may constitute either software (e.g., code embodied on a machine-readable medium) and/or hardware, depending on the context. In example embodiments, one or more computer systems (e.g., a standalone client or server computer system) or one or more hardware systems/subsystems of a computer system (e.g., a processor or a group of processors) may be configured by software (e.g., an application or application portion) as a hardware system that operates to perform certain of the described operations.

A hardware system may be implemented in dedicated and permanently configured circuitry, or in temporarily configured circuitry (e.g., configured by software). That is, a hardware system may comprise dedicated circuitry or logic that is permanently configured (e.g., as a special-purpose processor, such as a field programmable gate array (FPGA) or an application-specific integrated circuit (ASIC) to perform certain operations). Further, a hardware system may also comprise programmable logic or circuitry (e.g., as encompassed within a general-purpose processor or other programmable processor) that is temporarily configured by software to perform certain operations. Some or all of a hardware system may be remotely located (e.g., in a cloud computing environment).

Network(s)

As used herein and unless otherwise specified, when used in the context of system(s) or device(s) that communicate information or data, the term "network" refers to a collection of nodes (e.g., devices or systems capable of sending, receiving and/or forwarding information) and links which are connected so as to enable telecommunication between the nodes.

Generally speaking, the term "node" refers to a connection point, redistribution point, or a communication endpoint. A node may be any device or system (e.g., a computer system) capable of sending, receiving and/or forwarding information. For example, end-devices or end-systems that originate and/or ultimately receive a message are nodes. Intermediary device that receive and forward the message (e.g., between two end-devices) are also generally considered to be "nodes."

A "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals sometimes may be transmitted via the same band by allocating time slots over which respective transmitters and receivers use the band in question.

As already noted, a network is a collection of nodes and links. A network may include dedicated routers responsible for directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a personal area network (PAN), local area network (LAN), and/or a wide area network (WAN). Each of these may be wired or wireless networks. For example, Bluetooth technology may be used to connect to or establish a wireless PAN, and a USB interface may be used to establish or connect to a wired PAN. An example WAN is the Internet.

Communication Interface(s)

Some of the described devices and/or systems include a "communication interface" (sometimes referred to as a "network interface" or a "peripheral interface"). A communication interface of a system enables the system to send information or data to other system and/or receive information/data from other systems. In some instances, a communication interface of a system may be utilized to establish a direct connection to another system. In some instances, a communication interface of a system enables the system to connect to a network (via a link).

To illustrate, a communication interface can include circuitry for wireless or wired communication with one or more devices or systems using any suitable communications protocol. Wireless communication may be short-range and/or long-range. For example, a communication interface may support Wi-Fi (e.g., an 802.11 protocol), Ethernet, Bluetooth, high frequency systems (e.g., 900 MHZ, 2.4 GHZ, and 5.6 GHZ communication systems), infrared, transmission control protocol/internet protocol ("TCP/IP") (e.g., any of the protocols used in each of the TCP/IP layers), hypertext transfer protocol ("HTTP"), BitTorrent, file transfer protocol ("FTP"), real-time transport protocol ("RTP"), real-time streaming protocol ("RTSP"), secure shell protocol ("SSH"), any other communications protocol, or any combination thereof. One or more of these protocols may be utilized to connect to a PAN, LAN, and/or WAN. A communication interface of a system may also include circuitry that enables the system to be electrically or optically coupled to another device (e.g., via a coax cable or fiber optic cable) and to communicate with that other device.

Processor(s)

The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller and/or an I/O controller. A chipset is a collection of electronic components in an integrated circuit that is typically configured to provide I/O and memory management functions as well as a plurality of general purpose and/or special purpose registers, timers, etc. Generally speaking, one or more of the described processors may be communicatively coupled to other components (such as memory devices and I/O devices) via a system bus.

The performance of certain operations may be distributed among one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Memory and Computer-Readable Media

Generally speaking, as used herein the phrase "memory" or "memory device" refers to a system or device including computer-readable media ("CRM"). "CRM" refers to a medium or media accessible by the relevant computing system for placing, keeping, and/or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile and/or nonvolatile media, and removable and/or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

System Bus(es)

Generally speaking, a processor or a particular system or subsystem may communicate with other components of the system or subsystem via one or more communication links. When communicating with components in a shared housing, for example, the processor may be communicatively connected to components by a system bus. Unless stated otherwise, as used herein the phrase "system bus" refers to: a data bus (for carrying data), an address bus (for determining where the data should be sent), a control bus (for determining the operation to execute), or some combination thereof. Further, "system bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Data/Information Generation and Manipulation

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Embodiments

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Relational and Logical Expressions

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of the implementations herein. This description should be read to include one or at least one.

Upon reading this disclosure, those of skill in the art will appreciate still additional alternative structural and functional designs for a system and a process for inspecting a structure to estimate the condition of a structure through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A system comprising:
   (A) an unmanned surveyor including:
      (i) a vehicle;
      (ii) a camera carried by the vehicle; and
      (iii) a control system disposed on the vehicle and communicatively connected to the camera, the control system configured to:
         capture a real-world scene via the camera;
         wirelessly transmit an image signal representing the real-world scene; and
      (iv) a laser range finder configured to lase a target in the real-world scene;
   (B) a controller communicatively coupled to the unmanned surveyor via a wireless link, the controller including:
      (i) a communication interface configured to wirelessly receive the image signal transmitted by the control system of the unmanned surveyor via the wireless link;
      (ii) a headset configured to display the real-world scene based on the image signal;
      (iii) an actuator configured to be actuated by a user;
      (iv) a processor communicatively connected to the communication interface, the headset, and the actuator, the processor configured to: detect an actuation of the actuator; respond to the detected actuation by transmitting a command, via the communication interface, to cause the unmanned surveyor to lase the target in the real-world scene in order to determine a position of the target; and display, via the headset, an anchor point within the real-world scene at the position of the target.

2. The system of claim 1, wherein the laser range finder is a LIDAR laser range finder that lases the target in response to the unmanned surveyor receiving the command from the controller.

3. The system of claim 1, wherein the laser range finder uses a solid-state diode laser to lase the target in response to the unmanned surveyor receiving the command from the controller.

4. The system of claim 1, wherein the image signal representing the real-world scene carries streaming video of the real-world scene.

5. A method comprising:
   calibrating the unmanned surveyor by:
      (i) obtaining a position and an orientation of an unmanned surveyor;
      (ii) lasing, by the unmanned surveyor, a real-world object having a known position;
      (iii) utilizing, by the unmanned surveyor, a model to calculate an estimated position of the real-world object based on the lasing of the real-world object;
      (iv) calculating a model error by comparing the estimated position to the known position; and
      (v) updating the model to correct for the model error;
   capturing, by the unmanned surveyor, a real-world scene;
   transmitting, from the unmanned surveyor to a controller, an image signal representing the real-world scene;
   displaying, at a headset of the controller, the real-world scene based on the image signal;
   detecting, at the controller, an actuation of an actuator by a user;
   in response to detecting the actuation: transmitting a command from the controller to the unmanned surveyor to cause the unmanned surveyor to lase a target selected by the user via the actuation;
   determining a position of the target based on the lase; and
   displaying, at the headset of the controller, an anchor point within the real-world scene at the position of the target.

6. The method of claim 5, further comprising: before detecting the user-input, calibrating the controller to identify an area of focus within the displayed real-world scene corresponding to a gaze of a user, wherein the target falls within the area of focus.

7. The method of claim 5, wherein determining a position of the target based on the lase comprises: measuring a time-of-flight for the lase.

8. The method of claim 5, wherein the target is a blade of a wind turbine.

9. A system comprising:
   (A) an unmanned surveyor including a vehicle and a camera carried by the vehicle; and
   (B) a controller communicatively coupled to the unmanned surveyor via a wireless link, the controller including:

(i) a headset that displays streaming video of a real-world environment that has been captured by the camera of the unmanned surveyor and streamed to the controller via the wireless link;
(ii) one or more movement or position sensors disposed on or within the headset;
(iii) a processor, communicatively coupled to the one or more movement or position sensors, that: tracks an orientation of the headset corresponding to a gaze of a user of the headset based on a movement or position of the headset detected via the one or more movement or position sensors; and causes the controller to wirelessly transmit a command to
the unmanned surveyor to orient the camera of the unmanned surveyor to correspond to the tracked orientation of the headset so that the camera of the unmanned surveyor is aimed in a direction within the real-world environment in a manner that is responsive to the gaze of the user of the headset.

10. The system of claim 9, wherein the one or more movement or position sensors include a sensor selected from the group consisting of: an accelerometer, a gyroscope, and a compass.

11. The system of claim 9, wherein the one or more movement or position sensors include a global positioning system (GPS) receiver.

12. The system of claim 9, wherein the camera is rotatable around two or more axes, and wherein the command to the unmanned surveyor to orient the camera causes the camera to rotate around at least one of the two or more axes.

13. The system of claim 9, wherein the controller further includes a vehicle control interface including one or more actuators, wherein the processor further detects an actuation of the one or more actuators of the vehicle control interface and, in response, causes the controller to wirelessly transmit a movement-command to the unmanned surveyor to cause the vehicle of the unmanned surveyor to move in accordance with the detected actuation.

14. A method comprising:
wirelessly streaming video of a real-world environment, captured by a camera of a unmanned surveyor, from the unmanned surveyor to a controller;
displaying, at a headset of the controller, the streamed video of the real-world environment;
tracking an orientation of the headset corresponding to a gaze of a user of the headset by:
(i) determining a forward facing direction for the headset and calculating a first orientation of the headset;
(ii) receiving movement or position data from one or more movement or position sensors disposed on or within the headset, wherein the one or more movement or position sensors include both an accelerometer and a gyroscope; and
(iii) calculating, based on the calculated first orientation and the received movement or position data, a new orientation of the headset; and
orientating the camera of the unmanned surveyor to correspond to the tracked orientation of the headset so that the camera of the unmanned surveyor is aimed in a direction within the real-world environment in a manner that is responsive to the gaze of a user of the headset.

15. The method of claim 14, wherein orienting the camera of
the unmanned surveyor to correspond to the tracked orientation of the headset comprises:
rotating the camera around two or more axes.

16. The method of claim 15, wherein rotating the camera around the two or more axes comprises: rotating the unmanned surveyor around at least one of the two or more axes.

17. The method of claim 14, further comprising:
detecting an actuation of an actuator of a vehicle control interface of the controller;
wirelessly transmitting a movement-command from the controller to the unmanned surveyor in accordance with the detected actuation; and
moving the unmanned surveyor in response to the unmanned surveyor receiving the movement-command.

18. The method of claim 14, wherein displaying the streamed video of the real-world environment comprises displaying a 180 degree field of view of the real-world environment.

* * * * *